US006853980B1

(12) United States Patent
Ying et al.

(10) Patent No.: US 6,853,980 B1
(45) Date of Patent: Feb. 8, 2005

(54) SYSTEM FOR SELECTING, DISTRIBUTING, AND SELLING FONTS

(75) Inventors: Charles Ying, Seattle, WA (US); John S. Collins, Boston, MA (US)

(73) Assignee: Bitstream Inc., Cambridge, MA (US)

( * ) Notice: Subject to any disclaimer, the term of this patent is extended or adjusted under 35 U.S.C. 154(b) by 0 days.

(21) Appl. No.: 09/391,291

(22) Filed: Sep. 7, 1999

(51) Int. Cl.[7] .............................................. G06F 17/60

(52) U.S. Cl. ....................................................... 705/27
(58) Field of Search ..................................... 705/26, 27

(56) References Cited

U.S. PATENT DOCUMENTS

| 5,533,174 | A | * | 7/1996 | Flowers et al. | |
| 5,646,992 | A | * | 7/1997 | Subler et al. | 380/4 |
| 5,815,657 | A | * | 9/1998 | Williams et al. | 235/380 X |
| 5,859,648 | A | * | 1/1999 | Moore et al. | 707/542 X |
| 6,073,147 | A | * | 6/2000 | Chan et al. | 707/542 X |

FOREIGN PATENT DOCUMENTS

JP          02044397 A  *  2/1990

OTHER PUBLICATIONS

Font Developments, Seybold Report on Publishing Systems, v26, n21, p44, Aug. 4, 1997.*
Wilken, Earl, "In Search Of Fonts? Call An Associate.", Graphic Arts Monthly, Sep. 1, 1998, vol. 70, Issue 9, p. 112.*
Copies of pages downloaded from the current www.dtp-soft.de web site operated by DTP–Software in Aug. of 1999, including a one page screen shoot of the home page, a one page print out of the central frame of that home page, and two pages from that web cite describing FontExpert 2.0.
Copies of pages downloaded from the www.fonts.de web site operated by Linotype Library Gmbh in Aug. of 1999, describing Linotype Font Explorer.
Copies of pages downloaded from www.adobe.com web site operated by Adobe Systems Incorporated in Aug. of 1999, illustrating Adobe Systems' on–line font store including the browse capabilities provided by that font store.
Copies of pages downloaded from www.itcfonts.com web site operated by International Typeface Corporation downloaded in Aug. of 1999, illustrating ITC's on–line font store showing the browse and test drive capabilities provided by that font store.

* cited by examiner

Primary Examiner—F. J. Bartuska
(74) Attorney, Agent, or Firm—Edward W. Porter

(57) ABSTRACT

A computerized system, such as one practiced with an e-commerce font server, enables a user to select one or more fonts. According to one aspect, a user can select a font from a multi-dimensional font space defined by the attribute values of a plurality of fonts. The system repeatedly 1) enables the user to select a spatial specification defined relative to the currently selected font in the space; 2) determines which fonts, if any, match the spatial specification; 3) displays character-font shapes of those fonts; and 4) makes one of the displayed fonts a new currently selected font relative to which a new spatial specification can be selected. The spatial specification can merely selects fonts which are closest in the attribute space, can select the nearest font in a selected direction, or can provide more complex spatial selection. According to another aspect of the invention, a server makes fonts available to clients over a network. The server uploads from a client an image of one or more shapes belonging to a given font and performs pattern matching to select which fonts stored on the server best match the uploaded font shapes. The server downloads displayable font shapes for each such best matching font so a user can select one or more of them. It uploads information from the client identifying one or more fonts selected for downloading, and then downloads the selected fonts to the client in a form suitable for use by the client's operating system.

11 Claims, 42 Drawing Sheets

-server main loop~226
    -when server receive URL request~228
        -if it is for a named static web page~230
            -download that named page to the requested client~232
        -if it is for a named script~234
            -execute named script, using any information contained in the request~236
    -...

PRIOR ART
FIG. 2

-browser main loop~214
    -if user selects a link or control that requests a new page~216
        -request the new page with any information associated with the selection~218
    -when browser receive download of a new page~220
        -request download of all files identified by URL in the page's tags fields as part of the page, if they are not already cached on the client~222
        -display page with all of page's component files and start execution of all of page's applets~224
        -...
    -...

PRIOR ART
FIG. 3

-when server receives request for font store's <u>home page~238</u>
    -download home page~240

FIG. 4

-when browser receives font store's <u>home page~242</u>
    -display page including~244
        -introductory text~246
        -selectable links to major pages which include~248
            -browse page~248A
            -explore page~248B
            -identafont page~248C
            -my-cart page~248D
            -my-account page~248E
    -if user selects a link to a given page~260
        -upload a request for that page~262

FIG. 5

-when server receives request for font store's font-category <u>browse page~264</u>
    -downlod browse page~266

FIG. 6

-when browser receives font store's font-category <u>browse page~268</u>
    -display page including~270
        -for each major font category~272
            -a selectable category name~274
            -a selectable image of character-font shapes of a font in the category~276
        -selectable links to major pages~248
    -if user selects the category name or character-font shapes for a given font category~280
        -upload request for the given category's first font-category page~282
    -...

FIG. 7

-when server receives request for font store's <u>font-category page~284</u>
    -download the font-category page for the font category and page number specified in the request~286

FIG. 8

-when browser receives font store's font-category page~288
    -display page including~290
        -list of font families in selected category, displaying for each such font~292
            -a font family name~294
            -a selectable image of character-font shapes from one font in the font family~296
        -links to one or more numbered font-category pages for the current font category, if there are too many font families in the category to be listed on one page~298
        -selectable links to major pages~248
    -if user selects link to another numbered font-category page for the current font category~302
        -upload request for the given font-category page for the current font category~304
    -if user selects character-font shapes of a given font family~306
        -upload request for given font family's first font-family page~308
-...

FIG. 9

-when server receives request for font store's font-family page~310
    -download the font-family page for the font family and page number specified in the request~312

FIG. 10

-when browser receives font store's <u>font-family page~314</u>
    -display page including~316
        -name of font family~318
        -selectable more-like-this link~320
        -selectable add button~322
        -for each font in family~324
            -name of the font~326
            -selectable character-font shapes from the font~328
            -check box~330
            -selectable explore link~332
        -selectable links to major pages~248
    -if user selects explore link for a given font~336
        -if explore page is not currently open~338
            -upload request for explore page, with ID of given font~340
        -else~342
            -upload a request for currently-selected-font page, with ID of given font~344
    -if user selects a font's character-font shapes~346
        -upload request for test-drive page, with ID of selected font~348
    -if user selects more-like-this link~350
        -upload request for more-like-this page, with ID of current font family~352
    -if user selects add button~354
        -save identity of font family in a lastFontFamilyAdded variable~356
        -upload request for cart page, with ID of the fonts on page for which any check boxes which have been checked~358
-...

FIG. 11

-when server receives request for font store's <u>explore page~360</u>
    -if a currently selected font is specified in the request~362
        -set specified font as the currently selected font~364
    -else~366
        -set a default font as the currently selected font~368
    -download explore page~370

FIG. 12

-when browser receives font store's <u>explore page~372</u>
    -display page as a new window including~374
        -a selectable currently-selected-font page in a frame which shows~376
            -name of currently selected font~378
            -image of sample character-font shapes from currently selected font~380
        -controls for enabling user to select a direction in font space from currently selected font~382
    -if user selects a direction in font space~384
        -upload request for an explore move in specified direction~386
    -if user selects currently selected font window~388
        -upload request for currently selected font's first font-family page~390
    -...

FIG. 13

-when server receives request for font store's <u>currently-selected-font page~392</u>
    -download currently-selected-font page specified in the request~394

FIG. 14

-when browser receives font store's <u>currently-selected-font page~396</u>
    -display currently-selected-font page inside associated frame of the explore page~398

FIG. 15

-when server receives request for font store's <u>explore move~400</u>
    -find point in font attribute space having a location equal to that of the currently selected font specified in the request plus a standard length increment in the attribute direction specified in the request~402
    -make the font which is closest to that point the new currently selected font~404
    -download a currently-selected-font page the new currently selected font~406

FIG. 16

-when server receives request for font store's <u>identafont page~408</u>
    -download identafont first page~410

FIG. 17

-when browser receives font store's <u>identafont first page~412</u>
    -display page including~414
        -text describing identafont process and prompting user to specify image file for use~416
        -file name control~418
        -browse button~420
        -upload button~422
        -selectable links to major pages~248
    -if user selects browse button~426
        -allow user to browse client's file system and select file name for insertion into file name control~428
    -if user selects upload button~430
        -if there is a proper file name in file name control~432
            -upload request for upload-acknowledge page with contents of named file~434
-...

FIG. 18

-when server receives request for font store's <u>image-upload-acknowledge page~436</u>
    -if image contained in body of message is successfully uploaded~438
        -store it in conjunction with a client ID~439
    -generate and download an image-upload-acknowledge page which includes the uploaded image if an image was successfully uploaded from the request, along with a client ID cookie~440

FIG. 19

-when browser receives font store's image-upload-acknowledge page~442
    -display page including~444
        -text describing information on page~446
        -uploaded image, if successfully uploaded~448
        -selectable next link~450
        -selectable links to major pages~248
    -if user selects next link~454
        -upload request for recognition-results page~456
-...

FIG. 20

-when server receives request for font store's recognition-results page~458
    -perform character-font shape recognition in uploaded image having same client ID cookie as the request~460
    -generate a list of possible character-font shapes recognized in the uploaded text~462
    -generate and download recognized character-font shape page including images of listed character font shapes~464

FIG. 21

-when browser receives font store's recognition-results page~466
    -display page including~468
        -text describing information on page~470
        -a copy of uploaded image showing only shapes in the image which server considers likely to be character-font shapes~472
        -images of the character-font shapes found in image~474
        -a check box next to each such image~475
        -next button~476
        -selectable links to major pages~248
    -if user click next button~480
        -upload request for match-results page with the checked character-font shape images~482
-...

FIG. 22

-when server receives request for font store's <u>match-results page</u>~484
    -if request's client ID cookie matches that for which recognized uploaded character-font shapes have been stored on the server~486
        -use a list of user selected character-font shape ID contained in the request to obtain a set of uploaded character-font shapes for use in pattern matching~488
        -pattern match the user selected character-font shapes of that set against character-font shapes of fonts stored on server~490
        -generate and download a match-results page~492

FIG. 23

-when browser receives font store's <u>match-results page</u>~494
    -display page including~496
        -text describing meaning of match results~498
        -copy of uploaded image~500
        -ordered listing of best scoring font, displaying for each~502
            -match score~504
            -selectable font name~506
            -selectable character-font shapes~508
            -selectable test drive link~510
            -selectable font family link~512
            -selectable explore link~514
        -selectable links to major pages~248
    -if user selects font name, character-font shapes, or font family link for a given font~518
        -request font-family page for the given font~520
    -if user selects test drive link for a given font~522
        -request test-drive page for the given font~524
    -if user selects explore link for a given font~526
        -request explore page for the given font~528
    -...

FIG. 24

-when server receives request for font store's <u>test-drive page</u>~530
    -generate and download test-drive page for font specified in request using the font size and test text, if any, specified in the request and using default values for either font size or test text if not so specified~532

FIG. 25

-when browser receives font store's test-drive page~534
    -display page including~536
        -image of current test text in current font and font size~538
        -name of currently selected font~539
        -font size control showing current font size~540
        -test text control showing current test text~542
        -display button~544
        -selectable links to major pages~248
    -if user selects display button~548
        -upload request for test-drive page with current font, test text, and font size~550
-...

FIG. 26

-when server receives request for font store's more-like-this page~552
    -perform multi-dimensional closeness search in font space relative to font family specified in request to generate a list of best matching font families~554
    -generate and download more-like-this page displaying the page of the match results specified in the request~556

FIG. 27

-when browser receives font store's more-like-this page~558
    -display page including~560
        -list of best matching font families, displaying for each such font family~562
            -a font family name~564
            -a selectable image of character-font shapes from one font in the font family~566
        -selectable links to one or more numbered pages for results of the current more-like-this search, if there are too many font families in the search results to be listed on one page~568
        -selectable links to major pages~248
    -if user selects link to another numbered search results page for the current more-like-this search~572
        -upload request for the associated numbered search results page~574
    -if user selects character-font shapes of any displayed font family~576
        -upload request for associated font-family page from server~578
-...

FIG. 28

-when server receives request for font store's my-cart page~580
    -if user of ID of logged-in user is specified in request~582
        -add fonts identifed in request to shopping cart stored with user's account on server, and select fonts in user account's cart as fonts currently selected for purchase~584
    -else~586
        -select fonts identified in request as fonts currently selected for purchase~588
    -generate and download my-cart page specifying fonts currently selected for purchase~590

FIG. 29

-when browser receives font store's my-cart page~592
    -display page including~594
        -list of all fonts in the user's shopping cart, showing fore each its price and a delete button next to each such font's listing~596
        -total price for all selected fonts~598
        -selectable checkout link~600
        -selectable continue-shopping link~602
        -selectable links to major pages~248
    -if user selects delete button~606
        -upload request for my-cart page with indication that deleted font is not to remain in cart~608
    -if user selects checkout link~610
        -request checkout page~612
    -if user selects continue-shopping link~614
        -request font-family page identified in lastFontFamilyAdded variable~616
    -...

FIG. 30

-when server receives request for font store's checkout page~618
    -if user ID of logged-in user is not specified in request~620
        -download log-in page~622
    -else~624
        -generate and download checkout page for the user specified in request~626

FIG. 31

-when browser receives font store's log-in page~628
    -display page including~630
        -field to enter user name~632
        -field to enter password~634
        -submit button~636
        -link for new user registration~638
        -selectable links to major pages~248
    -if user presses submit button~642
        -upload request for log-in processing~644
-...

FIG. 32

-when server receives request for font store's log-in processing~646
    -verify that user name and password pair specified in request are recorded in association with a user ID stored in server's customer database~648
    -if so, generate and download checkout page for user ID for fonts currently selected for purchase specified in request and in user accounts cart~650
    -if not, download a page informing user of problem~652

FIG. 33

-when browser receives font store's checkout page~654
    -display page including~656
        -field to enter user's credit card number~658
        -field to enter user's credit card expiration date~660
        -purchase button~662
        -selectable links to major pages~664
    -if user selects purchase button~666
        -upload request for checkout processing with credit card information~668
-...

FIG. 34

-when server receives request for font store's <u>checkout processing</u>~670
    -send credit card number and expiration date specified in request to credit card processor~672
    -if credit card approval is obtained~674
        -generate and download font download page~676
    -else download a page explaining that credit card authorization was denied~678

FIG. 35

-when browser receives font store's <u>font download page</u>~680
    -display page including~682
        -text explaining how to download fonts~684
        -selectable link for the download of each of purchased font~686
        -selectable links to major pages~248
    -if user selects a given purchased-font's link~690
        -upload a request for download of the given font's font file~692
-...

FIG. 36

-when server receives request for a <u>font download</u>~694
    -download font file specified in request~696

FIG. 37

-if server receives a request for font store's <u>neighborhood explore page</u>~700
    -generate and download neighborhood explore page with current attribute values set to those of currently selected font specified in the request, relative attribute range set to default value, max number set to default, and page number set to one~702

FIG. 38

-if client receives font store's <u>neighborhood explore page</u>~704
    -display page as a new window including~706
        -currently-selected-font frame which show selectable name and character-font shapes of currently selected font~708
        -a currently-selectable-font page in a frame which shows~710
            -for each currently selectable font on page~712
                -name of font~714
                -selectable image of sample character-font shapes~716
            -selectable linke to each other page of currently-selectable fonts~718
        -controls which for each of a plurality of font attributes includes~720
            -an indication of the values of that attribute for the currently selected font~722
            -user-movable upper and lower relative range setting controls~724
        -control for selecting maximum number of best scoring fonts to be displayed as currently selectable fonts~726
        -an update button~728
    -if user selects update button~730
        -upload request for currently-selectable-fonts page with, currently selected font, attribute values, max number of best matches to display, and first page number~732
    -if user selects a currently selectable font~734
        -make it the currently selected font and display it in currentl selectd font window~736
    -if user selects a link to a numbered currently-selectable-font page~738
        -upload request for currently-selectable-fonts page specifying the current relative range control values for each attribute, the maximum number of best matches to display, and selected page number~740
    -if user selects the currently selected font~744
        -upload request for currently selected font's first font-family page~746
    -...

FIG. 39

-if server receives a request for font store's <u>currently-selectable-fonts page</u>~748
    -score which of fonts in font space come within, and then are closest to, spatial range specified in the request, and pick the best scoring maximum number of them~750
    -generate and download currently-selectable-fonts page of such best scoring font, having upto the maximum number of results specified in request, and having the page number specified in the request~752

FIG. 40

-if client receives font store's <u>currently-selectable-fonts page</u>~754
    -display currently-selectable-font page inside associated frame of the explore page~756

FIG. 41

-method of selecting a font~758
    -select a font using identafont pages~760
    -select explore for a best scoring font displayed on the match-results page~762
    -explore until find desired font~764

FIG. 42

-when browser receives font store's identafont first page~412
    -display page including~414
        -text describing identafont process and prompting user to specify <u>font~~image~~</u> file for use~416A
        -file name control~418
        -browse button~420
        -upload button~422
        -selectable links to major pages~424
    -if user selects browse button~426
        -allow user to browse client's file system and select file name for insertion into file name control~428
    -if user selects upload button~430
        -if there is a proper file name in file name control~432
            -upload request for <u>match-results</u>~~upload-acknowledge~~ page with contents of named file~434A
    -...

FIG. 43

-when server receives request for font store's match-results page~484
  -if request's client ID cookie matches that for which recognized uploaded character-font shapes have been stored on the server~486
      -use a list of user selected character-font shape ID contained in the request to obtain a set of uploaded character-font shapes for use in pattern matching~488
      -pattern match the ~~user-selected~~ character-font shapes <u>from font file uploaded with request</u>~~of that set~~ against character-font shapes of fonts stored on server~490A
  -generate and download a match-results page~492

FIG. 44

-when browser receives font store's match-results page~494
  -display page including~496
      -text describing meaning of test results~498
      -<u>name</u>~~copy~~ of uploaded <u>font file</u>~~image~~~500A
      -listing of best scoring font, displaying for each~502
          -match score~504
          -selectable font name~506
          -selectable character-font shapes~508
          -selectable test drive link~510
          -selectable font family link~512
          -selectable explore link~514
      -selectable links to major pages~516
  -if user selects font name, character-font shapes, or font family link for a given font~518
      -request font-family page for the given font~520
  -if user selects test drive link for a given font~522
      -request test-drive page for the given font~524
  -if user selects explore link for a given font~526
      -request explore page for the given font~528
  -...

FIG. 45

-when browser receives font store's identafont first page~412
    -display page including~414
        -text describing identafont process and prompting user to specify a font name~~image file for use~~~416B
        -~~font~~file name control~418B
        -font browse button~420B
        -upload button~422
        -selectable links to major pages~424
    -if user selects font browse button~426
        -allow user to browse a list of font names~~client's file system~~ and select a font~~file~~ name for insertion into font~~file~~ name control~428B
    -if user selects upload button~430
        -if there is a proper font~~file~~ name in font~~file~~ name control~432B
            -upload request for match-results~~upload-acknowledge~~ page with ~~contents of~~ named font~~file~~~434B
    -...

FIG. 46

-when server receives request for font store's match-results page~484
    -if server has a font file for the named font specified in the request~~request's client ID cookie matches that for which recognized uploaded character-font shapes have been stored on the server~~~486B
        ~~-use a list of user-selected character-font shape ID contained in the request to obtain a set of uploaded character-font shapes for use in pattern matching~488~~
        -pattern match ~~the user-selected~~ character-font shapes of the named font~~that set~~ against other character-font shapes of fonts stored on server~490B
        -generate and download a match-results page~492

FIG. 47

-when browser receives font store's match-results page~494
    -display page including~496
        -text describing meaning of test results~498
        -~~copy of~~ uploaded <u>font name and image of character-font shapes from named font</u>~~image~~~500B
        -listing of best scoring font, displaying for each~502
            -match score~504
            -selectable font name~506
            -selectable character-font shapes~508
            -selectable test drive link~510
            -selectable font family link~512
            -selectable explore link~514
        -selectable links to major pages~516
    -if user selects font name, character-font shapes, or font family link for a given font~518
        -request font-family page for the given font~520
    -if user selects test drive link for a given font~522
        -request test-drive page for the given font~524
    -if user selects explore link for a given font~526
        -request explore page for the given font~528
-...

FIG. 48

-when browser receives font store's identafont first page~412
    -display page including~414
        -text describing identafont process and prompting user to <u>copy a set of several different characters having only one font from another application into the client computer's clipboard and then to select the past button, and if the desired characters are pasted into the selected font window, to select the upload button</u><s>specify image file for use</s>~416C
        -<u>pasted-text window</u><s>file name control</s>~418C
        -<u>paste</u><s>browse</s> button~420C
        -upload button~422
        -selectable links to major pages~424
    -if user selects <u>paste</u><s>browse</s> button~426C
        -<u>paste fonted text from clipboard into a visible pasted-text window</u><s>allow user to browse client's file system and select file name for insertion into file name control</s>~428C
    -if user selects upload button~430
        -if there is <u>fonted text from only one font in the pasted-text window</u><s>a proper file name in file name control</s>~432C
            -upload request for <u>match-results</u><s>upload-acknowledge</s> page with <u>tagged text defining selected characters and their named font</u><s>contents of named file</s>~434C
    -...

FIG. 49

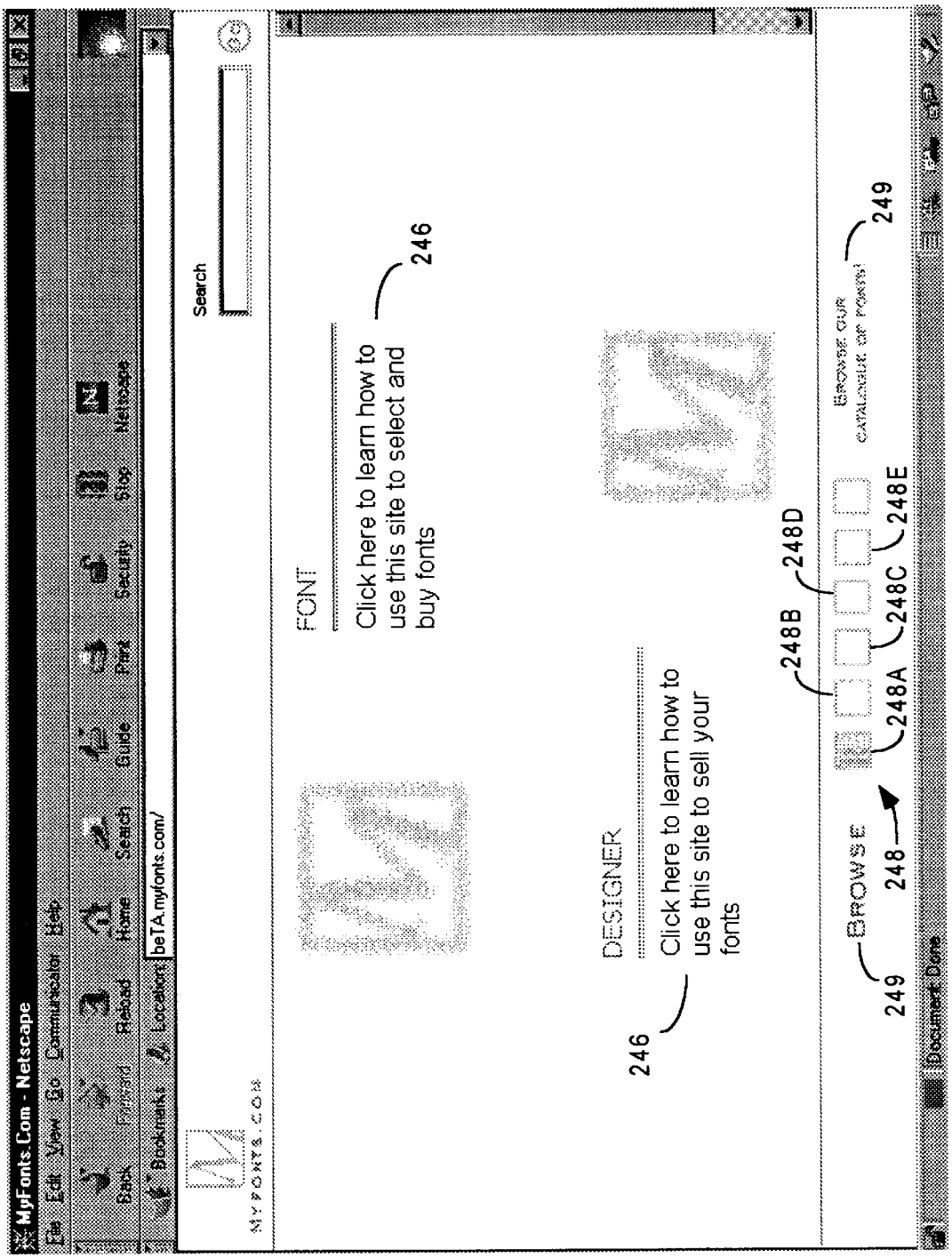

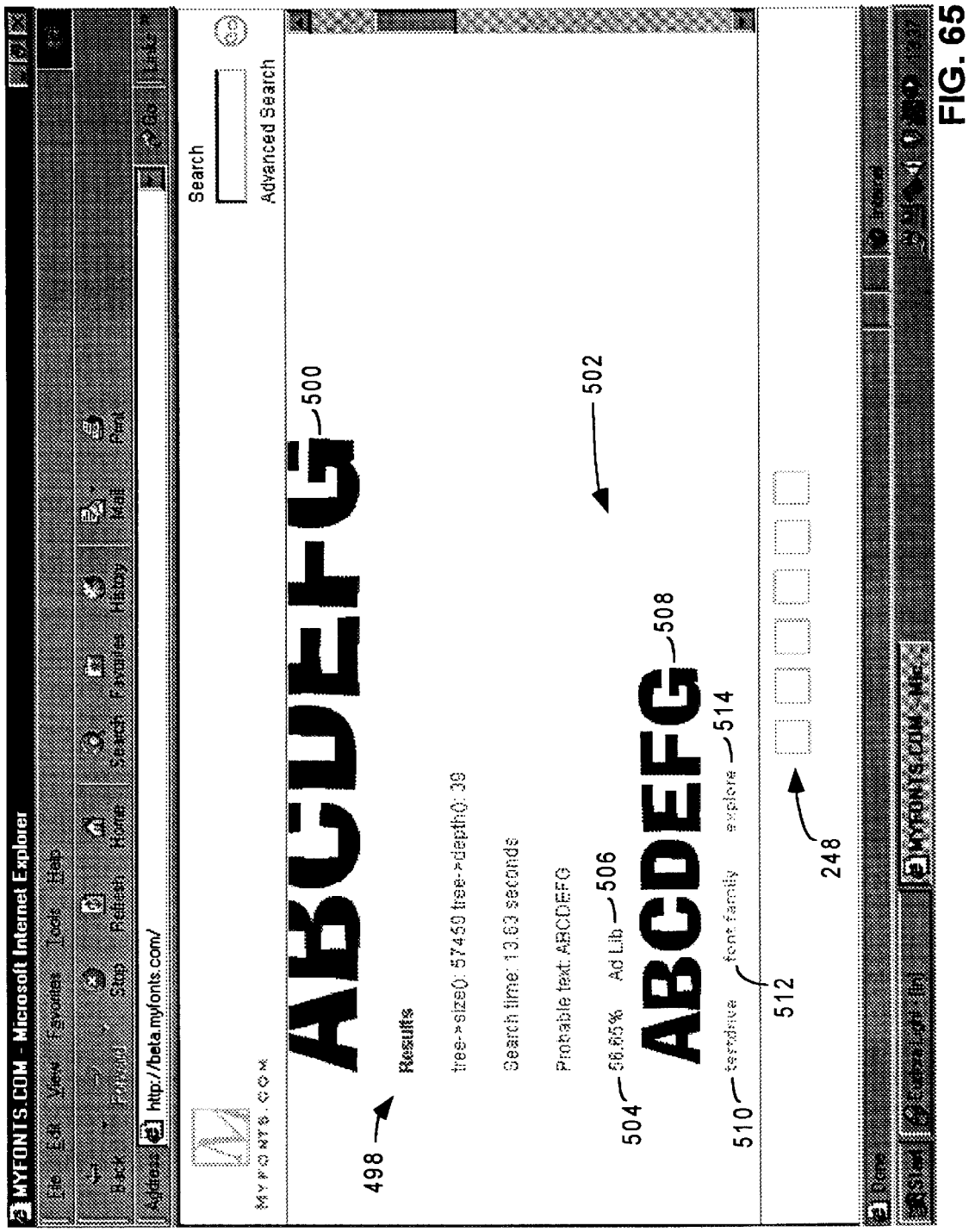

FIG. 69

URL: http://www.myfonts.com/ | Go | 1 2 3 4 5 >>

Currently Selected Font

Carrrina (Bitstream)
AaBbCcDdEe — 708

Attribute Dimensions

- Width
- Weight
- Contrast
- X-height
- Serif Size
- Irregularity
- Complexity
- Formality Max Fonts To Show  100 — 726

Update — 728

Best Matches — 710

1  Iumarist 777 (Bitstream) score: 52%
   AaBbCcDdEe

2  Square 721 (Bitstream) score: 45%
   AaBbCcDdEe — 716A

3  Handel Gothic (FotoStar) score: 40%
   AaBbCcDdEe

4  Chianti (Bitstream) score: 37%
   AaBbCcDdEe

5  Eras (ITC) score: 32%
   AaBbCcDdEe

6  Bank Gothic (ATF) score: 29%
   AABBCCDDEE

FIG. 73

Currently Selected Font ⎯708

Square 721 (Bitstream)
AaBbCcDdEe

Best Matches ⎯710    1 2 3 4 5 >>

1  Geometric 706 (Bitstream) score: 53%
   AaBbCcDdEe

2  Avant Garde Gothic (ITC) score: 51%
   AaBbCcDdEe

3  Geometric 212 (Bitstream) score: 47%
   AaBbCcDdEe

4  Chianti (Bitstream) score: 45%
   AaBbCcDdEe

5  Zapf Humanist 601 (Bitstream) score: 4
   AaBbCcDdEe

6  Handel Gothic (FotoStar) score: 39%
   AaBbCcDdEe

URL: http://www.myfonts.com/    Go

Attribute Dimensions

Width
Weight
Contrast
X-height
Serif Size
Irregularity
Complexity
Formality

Max Fonts To Show  100

Update

FIG. 74

SYSTEM FOR SELECTING, DISTRIBUTING, AND SELLING FONTS

FIELD OF THE INVENTION

The present invention relates to computer technology for the selection, distribution, and selling of computer fonts, that is, of software for representing and generating the shapes of alphanumeric characters and other images used with text.

BACKGROUND OF THE INVENTION

Since the beginning of the written word, humans have been concerned not only with how their words sound, but also with how they look. Before the advent of print, calligraphy was a major art form. With print, the art of creating and using fonts has superseded calligraphy in importance.

A font is a set of shapes representing each character in an alphanumeric character set. Usually the character-font shapes of a given font, that is, the shapes of the different characters in that font, share certain characteristics, such as horizontal and vertical position of certain shape features, the general width of their vertical and horizontal strokes, and whether or not they are serifed, bold, or italic, so that the characters of a given font look appropriate together.

In the current age of computer generated documents and WYSIWYG user interfaces, the most commonly used type of fonts are software fonts. Software fonts define the character-font shapes of a font in a manner than enables a computer to generate such shapes on computer screens and computer generated print outs. Such pre-defined font descriptions describe character shapes in a specified form or language. Some font languages represent shapes as bitmap images which can be translated directly to the pixels on a video display or a laser printer. This has the advantage of being fast, but it has the disadvantage of requiring a different set of font descriptions for each different size. More recently there has been a trend toward the use of scaleable font languages. These languages define a character's shape in terms of the one or more outlines which define its shape. Since these font descriptions define a shape in terms of lines and curves and since that definition is made with a high resolution, they can be used to generate font images of virtually any desired size.

There are currently several major scaleable font languages. They include PostScript, developed by Adobe Systems Incorporated, of 1585 Charleston Road, Mountain View, Calif. 94039, TrueType, developed by Apple Computer, Inc., 20525 Mariani Avenue, Cupertino, Calif. 95014; Speedo, developed by Bitstream Inc., the assignee of this application; and Intellifont, developed by the AGFA division of Miles Inc, 90 Industrial Way, Wilmington, Mass. 01887. Each of these languages uses a different code or format to describe and represent shapes in different ways. For example, TrueType uses quadratic Bezier curves to define the shape of curve segments, whereas PostScript and Speedo use Cubic Bezier curves, and Intellifont uses circular arcs.

Today there are many thousands of software fonts. The ability to vary fonts has many advantages. It lets a user vary the size of his letters to pack text more densely when necessary and to allow text to be more easily read. Using different fonts also has the ability to visually distinguish different parts of the text. This makes texts easier to scan and use. In addition, some fonts are more visually pleasing than others, whereas some are easier to read. Different fonts appeal to different aesthetic senses. Some appear traditional, some modern, some art nouveau, some art deco, some hand written, some humorous, and some shocking. The ability to select from a wide variety of fonts greatly increases the ability to tune the aesthetic message of a document.

Given the artistic and aesthetic benefits of being able to use the right font for the right documents, it is important that creators of documents be able to easily select and purchase fonts that have the right look and size for a desired usage, and that vendors of such fonts be able to make the available to users with as little overhead as possible.

SUMMARY OF THE INVENTION

It is an object of the present invention to provide a system which aids in finding a font having a desired look or desired features.

It is yet another object of the present invention to provide a system which aids in the distribution of fonts.

It is still another object of the present invention to provide a system which aids in the buying and selling of fonts.

According to one aspect of the present invention, a computerized method of enabling a user to select a font is provided. The method comprises storing information about each of a set of fonts, including a value of each of a plurality of attributes for each such fonts. These attributes, and their values, define a multi-dimensional font space in which each of the fonts has at least one position. The method enables a user to select a font from the font space as a currently selected font. The method then repeatedly: 1) enables the user to select one from a plurality of spatial specifications defined relative to the currently selected font as the current spatial specification; 2) determines which one or more fonts, if any, are in the sub-portion of the font space defined by the currently selected spatial specification; 3) displays one or more character-font shapes of the one or more fonts in the current specification's sub-portion of the font space; and 4) makes one of the fonts in the current specification's sub-portion of the font space the currently selected font relative to which a new spatial specification can be selected. Each user-selectable spatial specifications defines a sub-portion of the font space defined relative to the position of the currently selected font, and different spatial specification define sub-portions of the font space with different displacements in different dimensions of the space relative to the currently selected font.

In some embodiments of this aspect of the invention, the sub-portion of the font space defined by some spatial specifications includes only one font; and when only one font occurs in the sub-portion of the font space defined by the currently selected spatial specification, the one font is automatically made the currently selected font relative to which a new spatial specification can be selected. In some embodiments the sub-portion of the font space defined by some spatial specifications includes more than one font; and when more than one font occurs in the sub-portion of the font space defined by the currently selected spatial specification, the user is enabled to select which of the fonts is to be made the currently selected font.

In some embodiments of this aspect of the invention, the method is executed by an e-commerce server computer which can communicate with one or more client computers over a computer network. The server enables a user to select the currently selected font and the currently selected spatial specifications by downloading a user interface to a given client computer which allows the user to make such selections. Such embodiments further include: downloading a user interface to the client which allows a user to select to pay for the use of a selected font and which uploads to the server information about such a selection to pay for a selected font; and responding to an upload of information about such a selection to pay for a selected font by billing an account associated with the user.

According to another aspect of the invention, a computerized method of enabling a user to select a font is provided. The method comprises storing information about each of a set of fonts, including a value of each of a plurality of attributes for each such font, so as to define a multi-dimensional font space, as described above. The method enables a user to select a font from the font space as a currently selected font. Then it finds a sub-set of the fonts in the multi-dimensional font space which are closest to the currently selected font according to a multidimensional distance metric. Next it makes the fonts in the sub-set found by this process currently selectable fonts and displays one or more character-font shapes of each such currently selectable font. Then it enables the user to select one of the currently selectable fonts as a currently selected font.

According to another aspect of the invention, a computerized method of conducting electronic commerce on an internetwork having at least one server computer selling fonts and one or more client computers is provided. The method comprises storing information about each of a set of fonts so as to define a multi-dimensional font space, as described above. The method further includes having the server download a user interface to a given client computer. The user interface enables the user to repeatedly select a current location in the font space by moving in a selected one or more of the font space's dimensions; and have one or more fonts in the currently selected location displayed to the user as currently selectable fonts. The method then enables the user to select one or more of the currently selectable fonts as a font selected for purchase and to upload information indicating the one or more fonts selected for purchase and the identity of a party to be charged for such purchase. The server then bills a financial account associated with the party to be charged and downloads information which allows the user to use such fonts on his or her own computer.

According to some embodiments of this aspect of the invention, the information which defines a font space is stored on the server. The downloaded user interface enables a user to select a location in the font space, by enabling the user to select to move in a selected direction in the information space, and then uploads information about the selected move to the server. The server responds by selecting a set of one or more fonts, if any, corresponding to the location defined by such a move and by downloading representations of the fonts of that set to the client, including character-font shapes from each such font. The downloaded interface displays the set of fonts corresponding to the currently selected location as currently selectable fonts. The server responds to the upload of information indicating fonts selected for purchase by downloading the selected font to the client computer in a form which enables the font to be used by the operating system of a user's computer for the rendering of characters of that downloaded font.

According to another aspect of the invention, a method is provided for allowing a server computer to make fonts available to client computers over a computer network. The server uploads from a given client computer an image of one or more sample character-font shapes belonging to a given font. The server then performs pattern matching between the character-font shapes in the upload ed image and character-font shapes from each of a plurality of fonts which it stores to select one or more of the stored fonts having character-font shapes which best match the uploaded character-font shape. Next the server downloads to the client a representation of each of one or more of the best matching fonts, including one or more displayable character-font shapes for each such font. The server then uploads information from the client identifying one or more fonts as having been selected for downloading, which selected fonts can include the best matching fonts downloaded to the client. After this, the server downloads the one or more fonts identified as selected for downloading to the client in a form which enable such fonts to be used by the client's operating system for rendering text in the downloaded fonts.

According to some embodiments of this aspect of the invention, the method downloads to the given client computer a user interface. This downloaded user interface provides controls which help a user of the given computer upload the image. It displays the downloaded representations of the best matching fonts as currently selectable fonts. It enables a user to select one or more of the currently selectable fonts as a font selected for downloading. And it responds to a selection of one or more fonts as fonts selected for downloading by uploading the information identifying the selected fonts as fonts selected for downloading.

According to some embodiments of this aspect of the invention, the downloaded interface enables a user to provide information identifying which character-font shapes of the given font are in the uploaded image and it uploads that information to the server. In such embodiments the server uses the uploaded character-font shape identification information to substantially limit the pattern matching to pattern matching against the character-font shapes which the uploaded information identifies as being in the uploaded image. In some such embodiments the server attempts to automatically recognize character-font shapes from the uploaded image and downloads to the client the character-font shapes it has so recognized, and then the downloaded interface enables a user to select which of those downloaded character-font shapes recognized by the server are to be used in the pattern matching and uploads such selections to the server as the above-mentioned character-font shape identification information.

In some embodiments of this aspect of the invention the server downloads to the client not only the representation of each of the one or more best matching fonts but also an indication of the relative closeness of the match between each of those best matching fonts and the character-font shapes in the uploaded image.

In some embodiments of this aspect of the invention, the downloaded interface helps a user to upload the image by allowing the user to browse through the client computer's file system for files, by allowing the user to select a given file from the file system for uploading, and then by uploading the selected file.

In some embodiments of this aspect of the invention, the downloaded interface allows the user to select one of the user selectable fonts as a test font and to enter a sequence of test text, and then uploads the test font and test text to the server. The server responds by downloading an image of the test text in the test font to the client. And the downloaded interface displays the downloaded image of the test text in the test font.

In some embodiments of this aspect of the invention, the downloaded interface allows the user to select one of the user selectable fonts as a font, the font family of which is to be seen, and uploads such a selection to the server. The server responds by downloading to the client a representation of each of one or more fonts in the same font family as the selected font, including one or more displayable character-font shapes for each such font. The downloaded user interface displays the downloaded font representations as currently selectable fonts which can be selected for downloading.

In some embodiments of this aspect of the invention, the server responds to the uploading of information from the client identifying one or more fonts as having been selected for downloading not only by downloading the one or more fonts identified, but also by charging an account associated with a user of the client computer.

According to another aspect of the invention, a method of conducting electronic commerce on an internetwork is provided having at least one server computer selling fonts and one or more client computers from which a user can access such a server computer. The method includes downloading from the server to a given client computer a user interface which allows a user to indicate the selection of a font to be matched. The method further includes performing pattern matching between the character-font shape of one or more characters of the user selected font to be matched and the character-font shapes of corresponding characters in each of a plurality of fonts available for sale from the server. This pattern matching is done to determine which of the salable fonts have character-font shapes best matching the user selected font. The method causes the downloaded interface to display a representation of each of one or more of the best matching fonts as user selectable fonts, including displaying one or more character-font shapes from each such best matching font. The method further causes the downloaded interface to enable a user to select one of the user selectable fonts as a font selected for downloading. The method then uploads to the server information identifying one or more fonts selected for downloading. The server responds to an uploaded identification of one or more fonts selected for downloading by charging an account associated with the given client computer and downloading the identified fonts to the given client in a form which enable such fonts to be used by the font manager of an operating system for rendering text in the downloaded fonts.

In some embodiment of this aspect of the invention, the downloaded interface uploads an indication of the user selected font to be matched; the server performs the pattern matching and downloads the representation of each of the best matching fonts to the client; and the downloaded interface displays the downloaded representation of each of the best matching fonts. In some embodiments, the downloaded interface allows a user to indicate the selection of a font to be matched by allowing the user to select a graphic image of one or more character-font shapes belonging to that selected font; and the pattern matching includes matching character-font shapes automatically recognized by the server in the user-selected graphic image against character-font shapes in each of the fonts available for sale from the server. In other embodiments, the downloaded interface allows a user to indicate the selection of a font to be matched by selecting font file of a type suitable for use with a font manager; and the pattern matching includes matching the character-font shapes defined by the user selected font file against character-font shapes in each of a plurality of fonts available for sale from the server. In still other embodiments the downloaded user interface allows a user to indicate the selection of a font to be matched by selecting a font known by name to the server; the interface uploads the selected name; and the pattern matching includes matching character-font shapes associated with the font having the name uploaded to the server against character-font shapes in each of a plurality of the fonts available for sale from the server. Is some embodiments where a font name is uploaded, the interface allows the user to indicate the selection of a font to be matched by selecting a portion of fonted text displayed on the client computer which has a desired font; and the name of the selected font is extracted from marked-up text which defines the selected fonted text, either by the downloaded interface or by the server.

According to another aspect of the invention, a computerized method of enabling a user to select a font is provided. This method comprises storing information defining a font space as defined above; receiving from a user an image of sample character-font shapes belonging to a given font; performing pattern matching between the sample character-font shapes and stored representations of character-font shapes from each of a plurality of the known fonts to select one or more of the stored fonts having character-font shapes which best match the character-font shapes received from the user, and displaying the one or more best matching fonts, including one or more character-fonts shapes of each such font, as currently selectable fonts.

The method enables the user to select one of the currently selectable fonts as a currently selected font; and then it performs the following one or more times: 1) enabling the user to select a spatial specification relative to the currently selected font from among a plurality of such spatial specifications as the current spatial specification, each of which specifications defines a sub-portion of the font space defined by position relative to the currently selected font, with different spatial specification defining sub-portions of the font space with different displacements in different dimensions of the space relative to the currently selected font; 2) determining which one or more fonts, if any, are in the sub-portion of the font space defined by the currently selected spatial specification; 3) displaying one or more character-font shapes of the one or more fonts in the current specification's sub-portion of the font space; and 4) making one of the fonts in the current specification's sub-portion of the font space the currently selected font relative to which a new spatial specification can be selected.

In some embodiments of this aspect of the invention, when only one font occurs in the sub-portion of the font space defined by the currently selected spatial specification, that one font is automatically made the currently selected font relative to which a new spatial specification can be selected. In some embodiments, when more than one font occurs in the sub-portion of the font space defined by the currently selected spatial specification, the user is enabled to select which of the fonts is to be made the currently selected font.

In some embodiments of this aspect of the invention, the method is performed by a client/server system comprised of a server computer and one or more client computers connected to the server computer by a computer network. The server downloads a user interface to a given client which has communicated with it. The downloaded interface prompts the user to select an image of one or more character-font shapes and uploads that image to the server. The server receives the uploaded image, performs the pattern matching on character-font shapes in the uploaded image, and downloads a displayable representation, including character-font shapes, of each of the one or more best matching font to the client. The downloaded interface receives the downloaded representations of the best matching fonts, displays the best matching fonts as the currently selectable fonts, and allows the user to select one of the currently selectable fonts as the currently selected font.

In some such embodiments, the downloaded interface allows the user to select the current spatial specification and uploads the identification of the current spatial specification to the server. The server determines which, if any, known fonts are in the portion of the font space defined by the currently selected spatial specification and downloads a representation of each such known font to the downloaded interface. The interface displays the downloaded fonts which the server has found to be within the currently selected spatial specification, and enable the user to select one of the resulting currently selectable fonts for a given purpose.

BRIEF DESCRIPTION OF THE DRAWINGS

These and other aspects of the present invention will become more evident upon reading the following description of the preferred embodiment in conjunction with the accompanying drawings, in which:

FIG. 2 is a highly simplified pseudo-code description of the main loop of a standard server program, suitable for use in the e-commerce font server shown in FIG. 1;

FIG. 3 is a highly simplified pseudo-code description of the main loop of a standard browser program suitable for use in the client computers shown in FIG. 1;

FIG. 4 is a highly simplified pseudo-code description of how the server program of FIG. 1 responds to a request for its font store's home page;

FIG. 5 is a highly simplified pseudo-code description of how a browser responds to the download of the font store's home page;

FIG. 6 is a highly simplified pseudo-code description of how the server program responds to a request for its font-category browse page;

FIG. 7 is a highly simplified pseudo-code description of how a browser responds to the download of the font store's font-category browse page;

FIG. 8 is a highly simplified pseudo-code description of how the server program responds to a request for a font-category page;

FIG. 9 is a highly simplified pseudo-code description of how a browser responds to the download of a font-category page;

FIG. 10 is a highly simplified pseudo-code description of how the server program responds to a request for a font-family page;

FIG. 11 is a highly simplified pseudo-code description of how a browser responds to the download of a font-family page;

FIG. 12 is a highly simplified pseudo-code description of how the server program responds to a request for an explore page;

FIG. 13 is a highly simplified pseudo-code description of how a browser responds to the download of an explore page;

FIG. 14 is a highly simplified pseudo-code description of how the server program responds to a request for a currently-selected-font page;

FIG. 15 is a highly simplified pseudo-code description of how a browser responds to the download of a currently-selected-font page;

FIG. 16 is a highly simplified pseudo-code description of how the server program responds to a request for an explore move;

FIG. 17 is a highly simplified pseudo-code description of how the server program responds to a request for its first Identafont page;

FIG. 18 is a highly simplified pseudo-code description of how a browser responds to the download of the first Identafont page;

FIG. 19 is a highly simplified pseudo-code description of how the server program responds to a request for an image-upload-acknowledge page;

FIG. 20 is a highly simplified pseudo-code description of how a browser responds to the download of an image-upload-acknowledge page;

FIG. 21 is a highly simplified pseudo-code description of how the server program responds to a request for a recognition-results page;

FIG. 22 is a highly simplified pseudo-code description of how a browser responds to the download of a recognition-results page;

FIG. 23 is a highly simplified pseudo-code description of how the server program responds to a request a match-results page;

FIG. 24 is a highly simplified pseudo-code description of how a browser responds to the download of a match-results page;

FIG. 25 is a highly simplified pseudo-code description of how the server program responds to a request for a test-drive page;

FIG. 26 is a highly simplified pseudo-code description of how a browser responds to the download of a test-drive page;

FIG. 27 is a highly simplified pseudo-code description of how the server program responds to a request for a more-like-this page;

FIG. 28 is a highly simplified pseudo-code description of how a browser responds to the download of a more-like-this page;

FIG. 29 is a highly simplified pseudo-code description of how the server program responds to a request for a my-cart page;

FIG. 30 is a highly simplified pseudo-code description of how a browser responds to the download of a my-cart page;

FIG. 31 is a highly simplified pseudo-code description of how the server program responds to a request for a checkout page;

FIG. 32 is a highly simplified pseudo-code description of how a browser responds to the download of a log-in page;

FIG. 33 is a highly simplified pseudo-code description of how the server program responds to a request for log-in processing;

FIG. 34 is a highly simplified pseudo-code description of how a browser responds to the download of a checkout page;

FIG. 35 is a highly simplified pseudo-code description of how the server program responds to a request for checkout processing;

FIG. 36 is a highly simplified pseudo-code description of how a browser responds to the download of a font download page;

FIG. 37 is a highly simplified pseudo-code description of how the server program responds to a request for a font download;

FIG. 38 is a highly simplified pseudo-code description of how the server program responds to a request for a neighborhood explore page which is used in some embodiments of the invention;

FIG. 39 is a highly simplified pseudo-code description of how a browser responds to the download of a neighborhood explore page;

FIG. 40 is a highly simplified pseudo-code description of how the server program responds to a request for a currently-selectable-fonts page;

FIG. 41 is a highly simplified pseudo-code description of how a browser responds to the download of a currently-selectable-fonts page;

FIG. 42 is a highly simplified pseudo-code description of a method of selecting a font by first using the Identafont process and then an explore process;

FIGS. 43, 44, and 45 describe steps similar to the Identafont steps shown in FIGS. 18, 23, and 24, respectively, except that in the process of FIGS. 43, 44, and 45 the user uploads a font file, rather than an image of fonts, and the pattern matching is performed against the character font shapes defined by the uploaded font file;

FIGS. 46, 47, and 48 describe steps similar to the Identafont steps shown in FIGS. 18, 23, and 24, respectively, except that in the process of FIGS. 43, 44, and 45 the user uploads the name of a font known to the server, rather than an image of fonts, and the pattern matching is performed against the character-font shapes defined by the known font;

FIG. 49 is similar to FIG. 46 except in it the user can select the named font by selected fonted text having an appearance that he or she likes from another program and then upload a tagged representation of the text, including its font name.

FIG. 50 is a screen shot of the home page of the font store web site of the embodiment of the invention shown in FIG. 1;

FIG. 65 is a screen shot of a match-results page generated by the Identafont process of the font store web site;

FIG. 69 is a screen shot of a my-font-cart page generated by the font store web site;

FIGS. 71 through 74 are schematic drawings of a neighborhood explore page which can be generated by some embodiment of a web site font store according to an aspect of the present invention, showing how that page can be used to explore font space and select fonts having desired attributes;

DETAILED DESCRIPTION OF PREFERRED EMBODIMENTS

Figure 1:
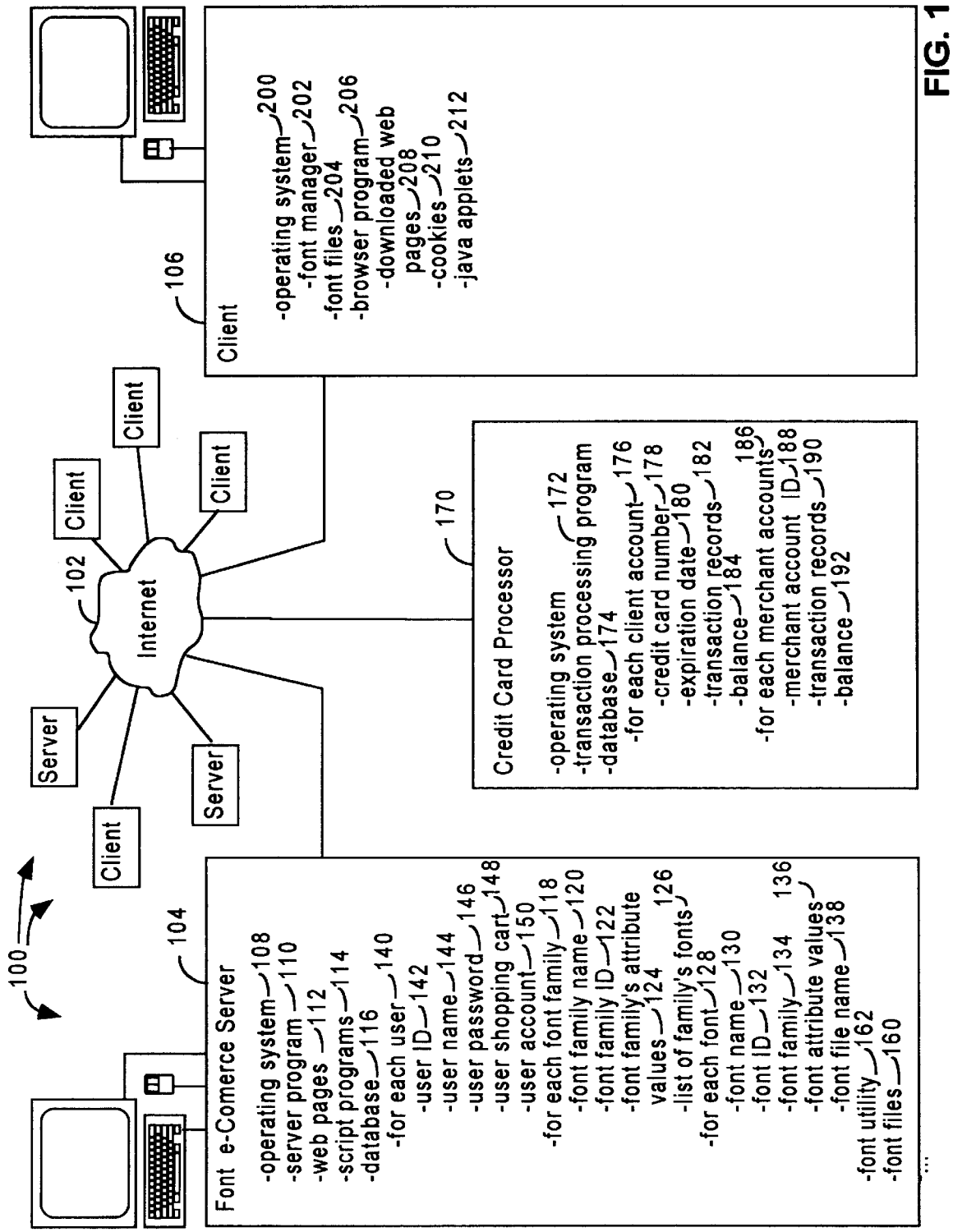
FIG. 1 is a high-level block diagram of one embodiment of the invention which is a system for the purchase and sale of fonts over the Internet.

FIG. 1 provides and overview of one of many possible embodiments for practicing the various aspects of the present invention. It discloses a system 100 for enabling customers to select and purchase fonts over a computer network, in this, case the Internet 102. The system includes an e-commerce server 104 which sells fonts, and one or more client computers 106 from which a user can access the server 104 for the purpose selecting and purchasing a font.

The server 104 can be any type of computer capable functioning as a network server computer. It includes an operating system 108 which provides the basic programmed functionality of the computer used by other programs. The server also includes a server program 110, which, in the preferred embodiment, is a web server, that is, a server capable of responding to requests from a client by downloading one of the web pages 112 that it stores, or by downloading a web page generated dynamically from a script program 114, such as a CGI, or Common Gateway Interface, script which it stores. The server 104 includes a collection of web pages and CGI scripts, which together define a font store web site. The server 104 also includes a database 116 which includes among other data, data 118 for each font family that it sells, data 128 for each font that it sells, and data 140 for each customer.

A font family is a group of fonts which are based on a common design, but which have differing characteristics such as weights or tilts. The data 118 stored for each font family includes the name 120 of the font family, the ID number 122 used to compactly represent the font family, a list 124 of the font family's attributes, and a list 126 of the fonts in the family.

The data 128 stored for each font includes the font's name 130, the font's ID 132, the ID 134 of the font family the font is in, a list 136 of the font's attributes, and the name 138 of the file 160 on the server which contains descriptions of the character-font shapes of the font. The font files 160 are in a form suitable for use by font utilities, such as font managers, which can be used with the major computer operating systems, such as the Macintosh OS, Microsoft Windows and NT operating systems, and UNIX, to render fonts on computer screens and computer generated printed output. A font manager is an entity which makes fonts available to an operating system for the rendering on a visual output device and which normally help provide a user interface for the installation, removal, and user for fonts. Font managers can either installed as part of the operating system or added on top of the operating system. In the embodiment of FIG. 1, different versions of font file are provided for use with different operating systems.

The data 140 for each customer includes a user ID 142, user name 144, user password 146, a user shopping cart 148, which stores fonts which have been selected for purchase by a customer but which have not yet been purchased, and a user account history 150 which provides a record of the fonts which the customer has previously purchased and financial information about the customer's account.

The database of the server 104 also includes other data not shown in FIG. 1, including data for each of a plurality font vendors, including a name, an address, a list of font families, a list of fonts, and an account history for each such vendor. This is needed by a preferred embodiment of the invention the e-commerce font server make available to customers fonts from multiple vendors so as to provide as large a selection of available fonts as possible.

The server 104 also stores a font utility program 162, such as a font manager, which can read font files 160 and generate character-font shapes from them for inclusion in some of the web pages which are generated dynamically by some of the server's script programs 114.

Although in other embodiments of the invention an e-commerce font server could bill customers directly for the purchase of fonts, in the preferred embodiment shown in FIG. 1, the font server indirectly charges customers for such purchases by using a separate credit card processor 170 to charge the costs of such purchases to customer credit card accounts. The credit card processor is a system 170 of one or more computers which is normally operated by one or more companies other than that operating the font server. The credit card processor includes a transaction program 172 and a database 174. The database 174 includes data 176 on each of a plurality of credit card accounts, including credit card number 178, expiration date 180, transaction records 182, and balance information 184 for each such account. It also includes data 186 for each of a plurality of merchants, including a merchant ID 188, transaction records 190, and a balance 192. When a customer seeks to purchase a font, the font server 104 sends a merchant ID associated with the font server, the customer's credit card number and expiration date, and the charge amount to the credit card processor 170. The credit card processor verifies if the combination of the credit card number and expiration date are valid and if the amount of the charge is less than the credit card account's associated available credit limit. If so, a transaction record is created charging the credit card account, and its balance is decremented by the amount of the charge, and a transaction record is made correspondingly crediting the account identified by the merchant ID.

The client computer 106 shown in FIG. 1 can be any type of computer capable of accessing servers over the World Wide Web. The particular client 106 shown in FIG. 1 includes an operating system 200 which has a font manager 202 installed in it. As stated above, font manager is a utility program which helps an operating system use and manage font files 204. It lets a user install and remove font file from use by the operating system and performs the task of converting font descriptions contained in installed font files into rasterized character-font shapes suitable for use by the display and print capabilities of a computer.

The client computer 106 also includes a browser program 206 which allows the computer to access web sites, including the font server 104, and display web pages 208 downloaded from such sites. Web browsers are capable of sending HTTP requests out on a computer network, such as the Internet, which supports such requests.

As is well known in the networking art, HTTP stands for Hypertext Transfer Protocol, a messaging protocol used to transfer information on the Web. Each HTTP request message contains a URL, or Uniform Resource Locator, identifying the requested file by the Internet address of its server and its path name on that server. The HTTP request also includes the Internet address of the client requesting the file. When a client sends an HTTP request out on a network which supports such requests, the message is routed to the server associated with the URL by routers in the network which contain look-up tables which map URLs into network addresses.

When a server computer receives a request which has been addressed to it, the server program running on that computer responds to the request. If the URL of the request identifies the file of a specific web page on the server computer, the server sends, or downloads, the requested web page file to the client which requested it. If the URL contains the name of a script file on the server, the server passes the message to the script file, which processes the message, including any data contained in the message. Such processing almost always includes downloading a file to the client which generated the request, so the client's user will know the message has been received. Commonly the downloaded web page is generated dynamically by the indicated script program to indicate a specific response to the data uploaded in the script request.

When a web browser receives the download of a web page in response to an HTTP request, it normally displays the page, including any controls included in the page, and runs any software applets downloaded with the page. A web page is normally composed of HTML text, where HTML stands for HyperText Mark-up Language. An HTML file includes normal text, which is displayed as part of the web page's visual presentation to a user, and tags, which are instruction to a browser.

Some tags include instructions on how to display the normal text portions. Some tags indicate which portions of the displayed text are hypertext links, that is, displayed text which if clicked, will cause the browser's display to move to a specific part of the current page or will cause the browser to request and display a new page which is identified by URLs in such tags. Other tags include the URLs of other files which are to be requested from servers, downloaded, and used as part of the current page. This includes image files which are commonly used to add photographs and graphic images to web pages. Tags can also be used to associate hypertext links with such downloaded images, enabling a user to select given portions of a page or new pages by clicking on such images. Tags can also include the URLs of applets, such as Java applets 212, which are small computer programs which can be requested from a server, downloaded, and executed by the browser to add programmed functionality to a page. Java applets can perform an unlimited number of functions, but perhaps their most common use is to provide animations, sound effects, and customized controls for web pages. Tags can also be used to identify pages which are to be downloaded and displayed in separate rectangular portions of a page called frames.

Web pages commonly include forms which include edit boxes into which users can type text, and other controls which allow users to enter or select information. Applets can also be used to obtain information from users. Once a web page has obtained such information, a user can select to have it uploaded to a server by pressing a submit button, which commonly has a name such as submit or upload. A server can download variable information to a browser for display in the forms or controls of a given page as well as in the form of so-called "cookies 210 for longer storage on the browsers computer. The server can select various length life times for different cookies, making some of them very short lived and others relatively permanent. A browser can upload any cookies associated with a given URL when it makes a request to that URL, enabling the browser to store user settings, account numbers, and other information useful in enabling a user of a given client computer to have an individualized relationship with a given server.

FIGS. 2 and 3 provide highly simplified pseudo-code summaries of the standard manner in which both the server program 110 and the client program 206 shown in FIG. 1 operate.

As FIG. 2 shows, the main loop 226 of the server program repeatedly responds to the receipt of HTTP requests. Each time such a request is received, a step 228 causes steps 230 to 236 to be performed. If the request is for a named static web page or file, Step 230 causes step 232 to download that named page or file to the requested client. If the request is for the execution of a named script, steps 234 and 236 cause the named script to be executed, passing as input to the script any information contained in the request.

As FIG. 3 shows, when a user selects a link or control that requests a new page, steps 216 and 218 send out an HTTP request for that page with any information associated with the selection. The user can select a new page by clicking on a bookmark in his browser, typing in the URL of a desired page and selecting the button that causes a request for the selected URL to be generated, or by typing one or more controls or links in a page already displayed. Normally after such a request for a new page has been generated, the requested page will be downloaded to the client.

As FIG. 3 also shows, when the browser receives a download of a new page, step 220 causes steps 222 and 224 to be performed. Step 222 requests the download of all files identified in the page's tags fields as part of the page, if they are not already cached on the client. Then step 224 displays the page with all of the page's downloaded or cached component files and starts execution of all of the page's applets.

FIGS. 4–36 are highly simplified pseudo-code descriptions, somewhat similar to those of FIGS. 2 and 3, of the manner in which the server and client programs respond, respectively, to requests for, and the download of, the web pages which the system of FIG. 1 uses to practice many aspects of the present invention.

FIG. 4 shows that when the server program 110 receives a request for its font store web site's home page, steps 238 and 240 cause the server to download a copy of the font store's home page file.

FIG. 5 shows that when the browser receives the font store's home page, a step 242 causes steps 244 through 262 to be performed. Step 244 displays the home page, as shown in FIG. 50, including introductory text 246, and a set of selectable links 248 to the major pages of the font store web site, including a link 248A to the a browse page, a link 248B to an explore page, a line 248C to an Identafont page, a link 248D to a my-cart page, and a link 248E to a my-account page. In the particular embodiment of the invention shown, each of the links 248 identify their function with explanatory text 249 only if the user places the cursor over the link, as is indicated for the browse link 248A in FIG. 50. If a user clicks on a link to a given one of these selectable pages, steps 260 and 262 of FIG. 5 upload a request for that page.

If a user clicks on the link 248A to the browse page, steps 260 and 262 will upload to the font server a request for the browse page. Although not shown in the drawings, in the preferred embodiment clicking on the browse link 248A allows the user to select to browse by font category name, by font foundry name, or by designer name. In the example described in the figures, it is assumed the user selects to browse by font category name, which generates a request for a font-category browse page.

FIG. 6 show that when the server receives a request for font store's font-category browse page, steps 264 and 266 cause it to download that page to the requesting browser.

Figure 51:
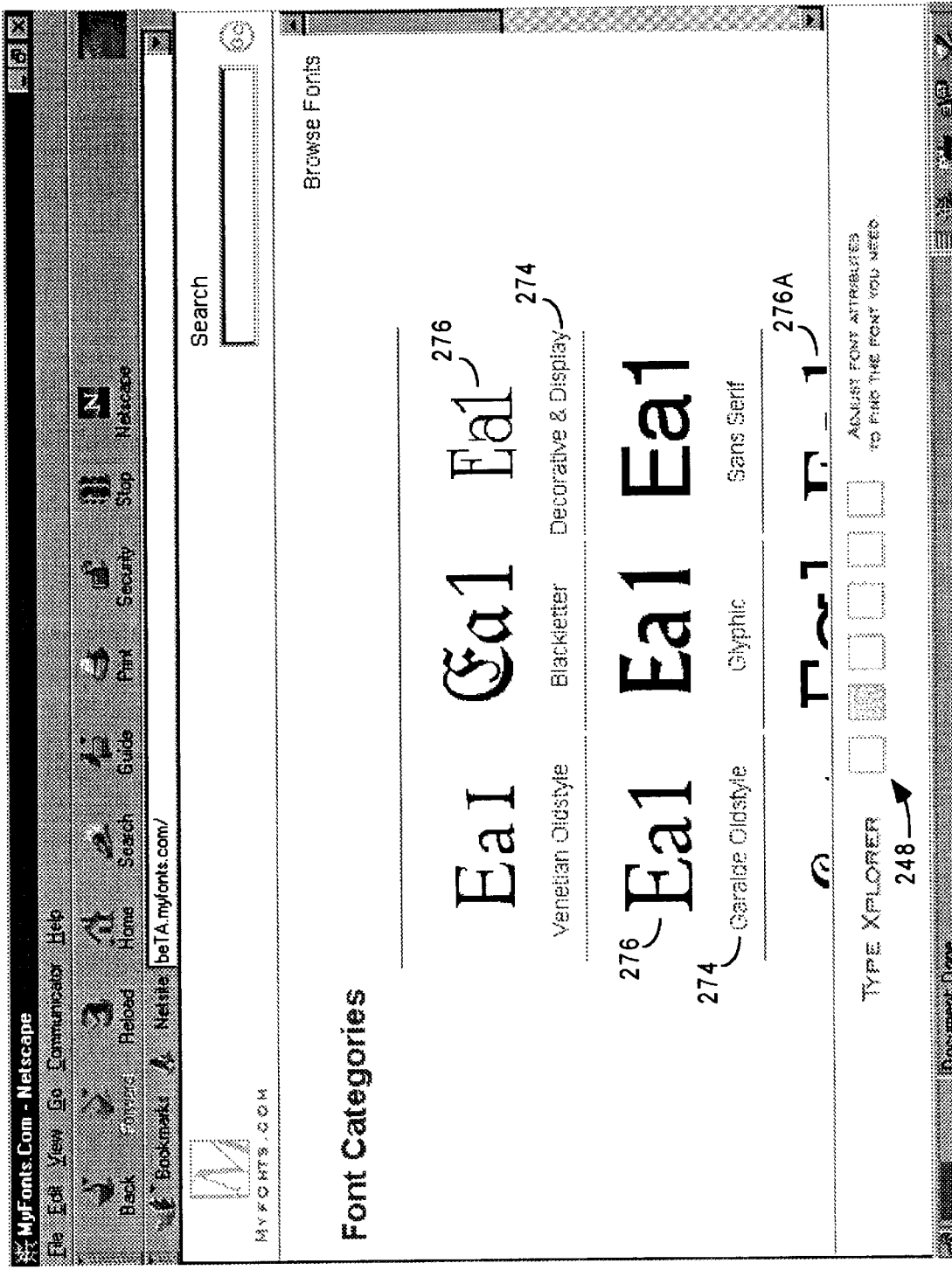
FIG. 51 is a screen shot of the initial font-category browse page of the font store web site.

FIG. 7 shows that when the browser receives the downloaded font store's font-category browse page, steps 268 causes steps 270 through 282 to be performed. Step 270 displays the downloaded browse page. As shown in FIG. 51 this page includes a display of major font categories, and displays for each such category a category name 274 and an image 276 of character-font shapes from a font in the category, both of which are selectable as links. The page, like the home page discussed above, and most of the other pages in the font store web site also displays the links 248 to the font store's major web pages, which if clicked will cause the display to advance to the selected page.

If a user selects the category name 274 or character-font shapes 276 for a given font category, steps 280 and 282 upload to the font store server a request for the given category's first font-category page. In the example of FIG. 51, is it assumed that the user has clicked on the character-font shapes 276A, which if the user scrolled down in the central frame of that page would be labeled "Transitional". This would result in a request for the first font-category page for the "Transitional" font category.

Figure 52:
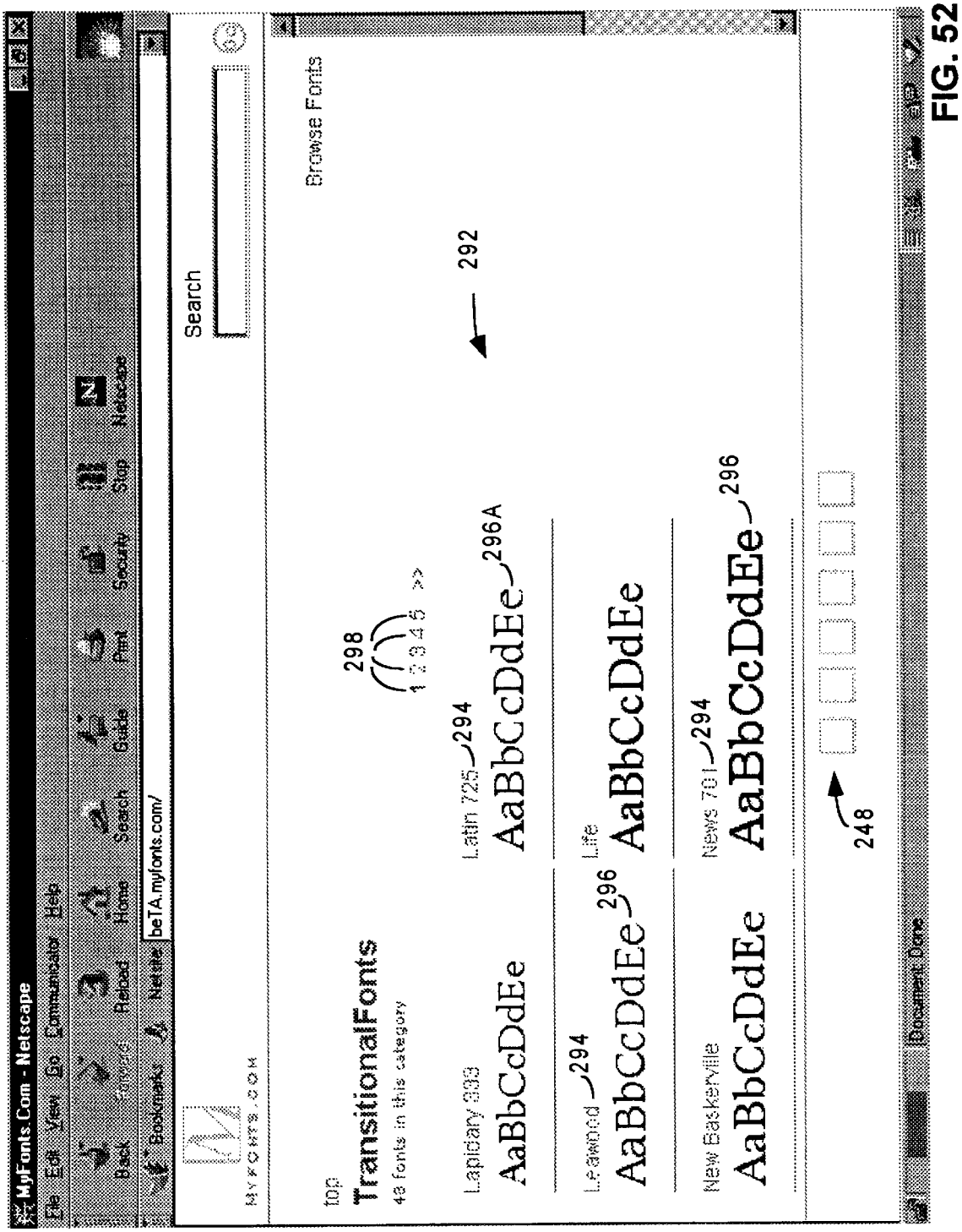
FIG. 52 is a screen shot of a font-category page of the font store web site.

As FIG. 8 indicates, when the font store server receives request for a font-category page, steps 284 and 286 cause the server to download the font-category page for the font category with the page number specified in the request. Some font categories contain so many fonts that they are downloaded as a set of separate pages to reduce the amount of time required for each download. For example, the Transitional Fonts category, whose first font-category page is shown in FIG. 52, contains so many fonts that the entire category is downloaded in five separate pages, as indicated by the page links 298. When a font-category page is requested from the browse page, the first page of the one or more pages associated with the selected font category is always requested. The user can then select to see later pages by clicking on one of the page links 298.

FIG. 9 shows that when the browser receives a downloaded font-category page, such as the page shown in FIG. 52, step 288 causes steps 290 through 308 to be performed. Step 290 displays the font category page including a list 292 of font families in the selected font category. This list displays for each such font a font family name 294, a selectable image 296 of character-font shapes from one font in the font family, and the above discussed page links 298 to one or more numbered font-category pages for the current font category, if there are too many font families in the category to be listed on one page.

If a user selects link 298 to another numbered font-category page for the current font category, step 302 and 304 cause the browser to upload a request for that other numbered font-category page for the current font category. If a user selects the character-font shapes 296 of a given font family, steps 306 and 308 upload a request for the given font family's first font-family page. In the example shown in the figures, it is assumed that the user clicks on the character-font shape image 296A of the "Latin 725" family shown in FIG. 52.

As shown in FIG. 10, when the font store's server receives a request for a font-family page, steps 310 and 312 cause the server to download the font-family page for the font family with the page number specified in the request.

Figure 53:
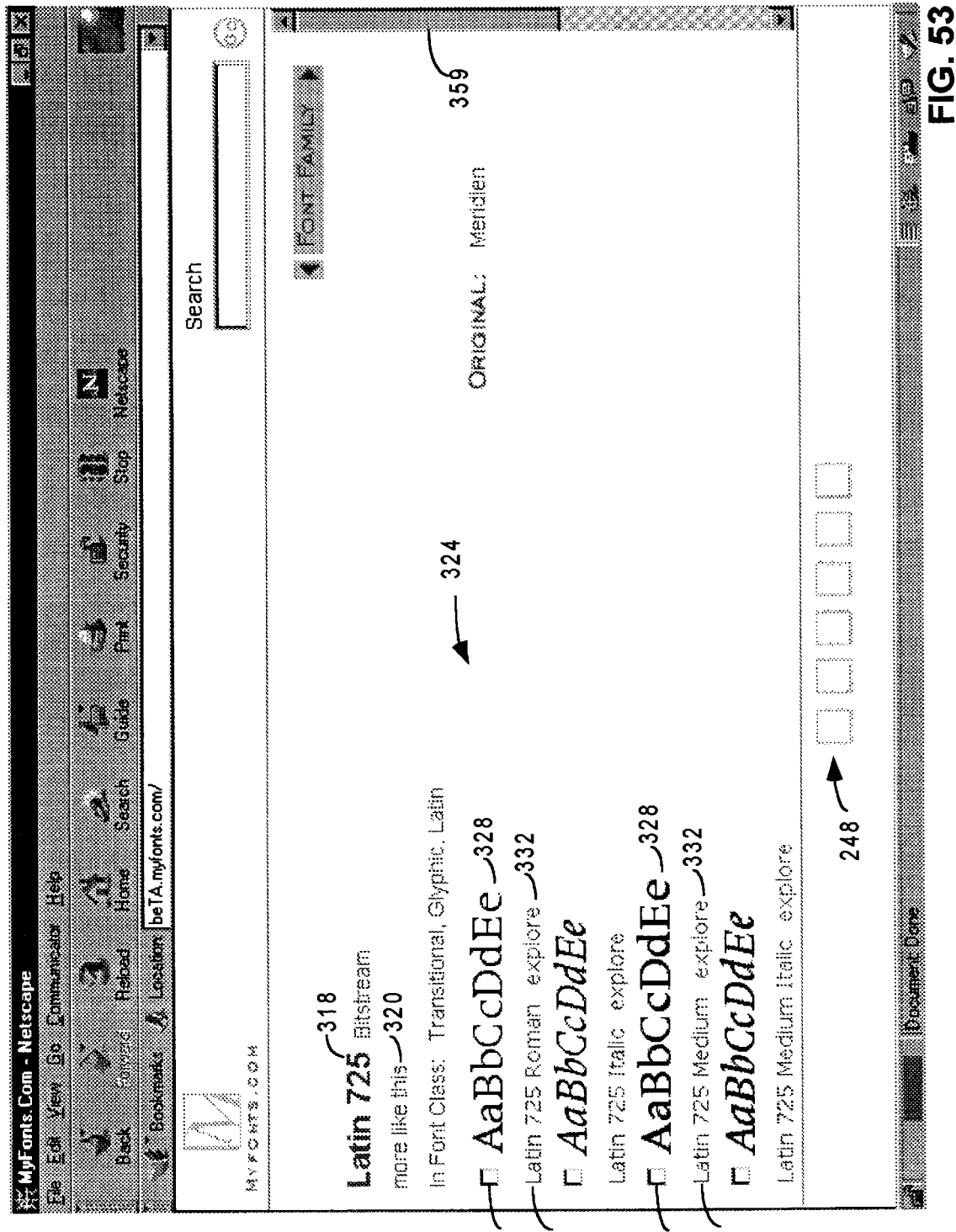
FIGS. 53 and 54 are screen shots of a font-family page of the font store web site.
Figure 54:
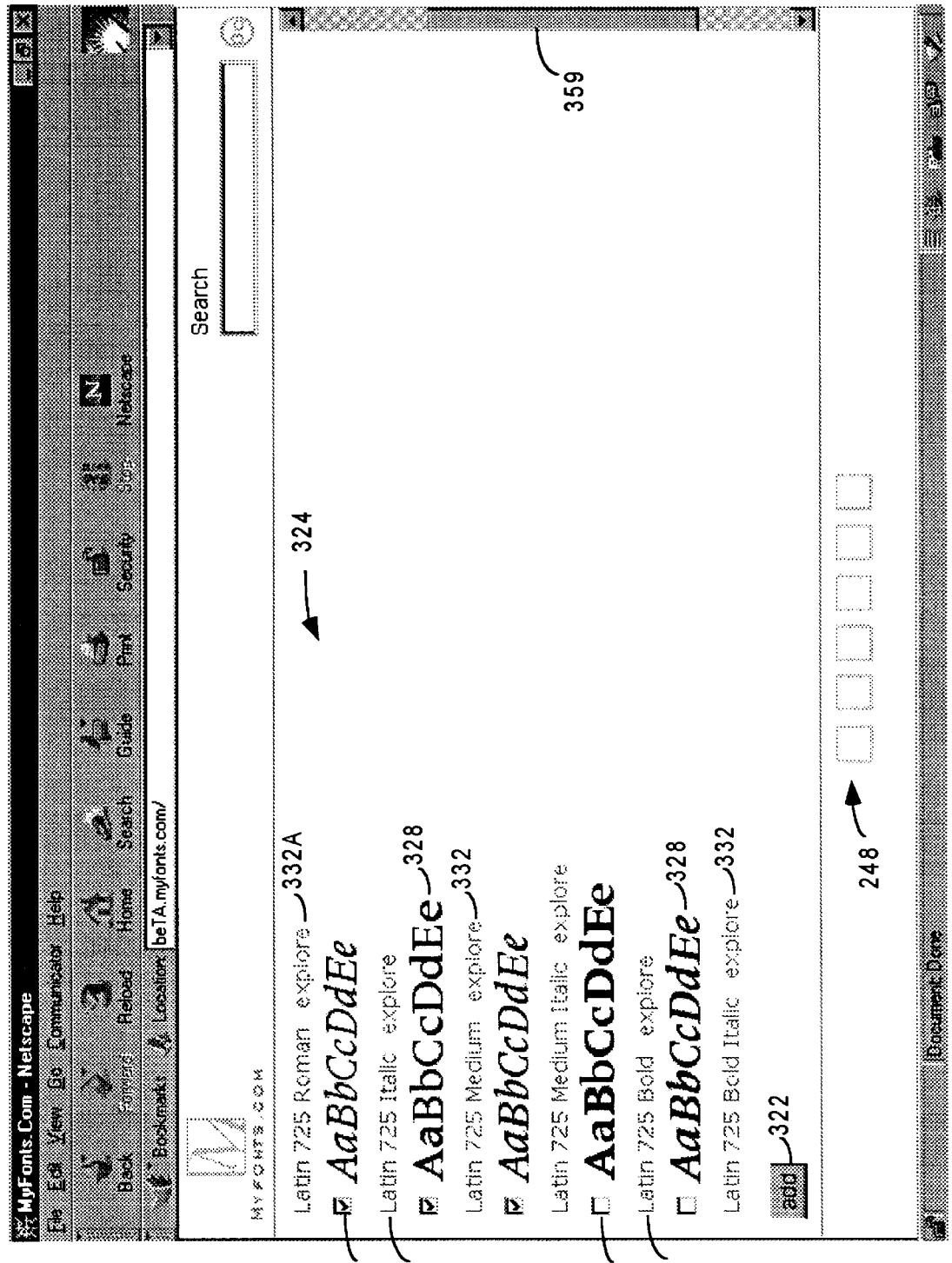

As shown in FIG. 11, when the browser receives the download of such a font-family page, step 314 causes steps 316 through 358 to be performed. Step 316 displays the page, as shown in FIGS. 53 and 54. FIG. 53 shows the font-family page for the Latin 725 font family as it looks when first downloaded. FIG. 54 shows the same page after the user has used the scroll bar 359 to scroll down to the bottom of the page's list of fonts in the family. As can be seen from these two figures, the page includes the name of the font family 318 (shown in FIG. 53), a selectable more-like-this link 320 (shown in FIG. 53) which allows a user to find a list of font families having similar attributes to the current font family, an add button 322 (shown in FIG. 54) which allows the user to added checked fonts to his or her shopping cart, and a list 324 of the fonts in the family. For each font in this list 324, the page displays the name of the font 326, a selectable image 328 of character-font shapes from the font, a check box 330 to allow a user to indicate a desire to add the font to the user's shopping cart, a link 332 to allow the user to explore in font space starting with the font. Like most of the other pages, the page includes the links 248 to the major pages of the font store site.

If a user selects the explore link for a given font, step 336 cause steps 338 through 344 to be performed. If the explore page is not currently open on the client, step 338 and 340 upload a request for the explore page, with the ID of the given font. If the explore page is already open on the client, steps 342 and 344 will upload a request for the currently-selected-font page, with the ID of the given font. As will be explained below, the explore page allows a user to navigate in a multi-dimensional font-attribute space starting from the font identified in the currently-selected-font page.

If a user clicks the image 328 of a given font's character-font shapes, step 346 and 348 will upload a request for a test-drive page, with the ID of the given font. As will be explained below, this will allow the user to see how the font looks at different point sizes and with different text.

If the user selects the more-like-this link 320, steps 350 and 352 will upload a request for a more-like-this page, with the ID of the current font family, which will list font families having similar attributes as the current font family.

If the user selects the add button 322 shown in FIG. 54, step 354 will cause steps 356 and 358 to be performed. Step 356 saves the identity of the current font family in a lastFontFamilyAdded variable stored on the client computer, so the browser will know which font-family page to return to after returning from the my-cart page or pages related to it, and then step 358 uploads a request for the font store's my-cart page, with the ID of the fonts on the current font-family page for which the check boxes 330 have been checked.

If a user selects the explore function, either by clicking on the explore link 332 on a font-family page, or on the explore link 248B shown at the bottom of almost all of the font store's pages, the browser will upload an explore request, in a manner described above with regard to steps 338 through 344 of FIG. 11. In the example of the figures, it is assumed the user has clicked on the explore link 332A shown in FIGS. 53 and 54

FIG. 12 shows that when the font store server receives request for its explore page, step 360 causes steps 362 through 370 to be performed. Step 362 tests if a currently selected font is specified in the request. If so, step 364 set the specified font to be the currently selected font. Otherwise steps 366 and 368 set the currently selected font to a default value. Once this is done step 370 downloads the explore page with the ID of the currently selected font.

As shown in FIG. 13, when the browser receives a download of the font store's explore page, step 372 causes steps 374 through 390 to be performed. Step 374 displays the explore page as a new window 375, shown in FIG. 55. This page includes a selectable currently-selected-font page 376, which is displayed within a frame. The currently-selected-font page includes the name 378 of the currently selected font and an image 380 of sample character-font shapes from the currently selected font. The browser displays this page by uploading a request for it to the font store server. As indicated in FIG. 14, when the server receives a request for a currently-selected-font page, steps 392 and 394 of the server program cause a currently-selected-font page to be downloaded for the current page. As indicated in FIG. 15, when the client receives the download of such a page, steps 396 and 398 display the page inside the page's associated frame in the explore window.

Figure 55:
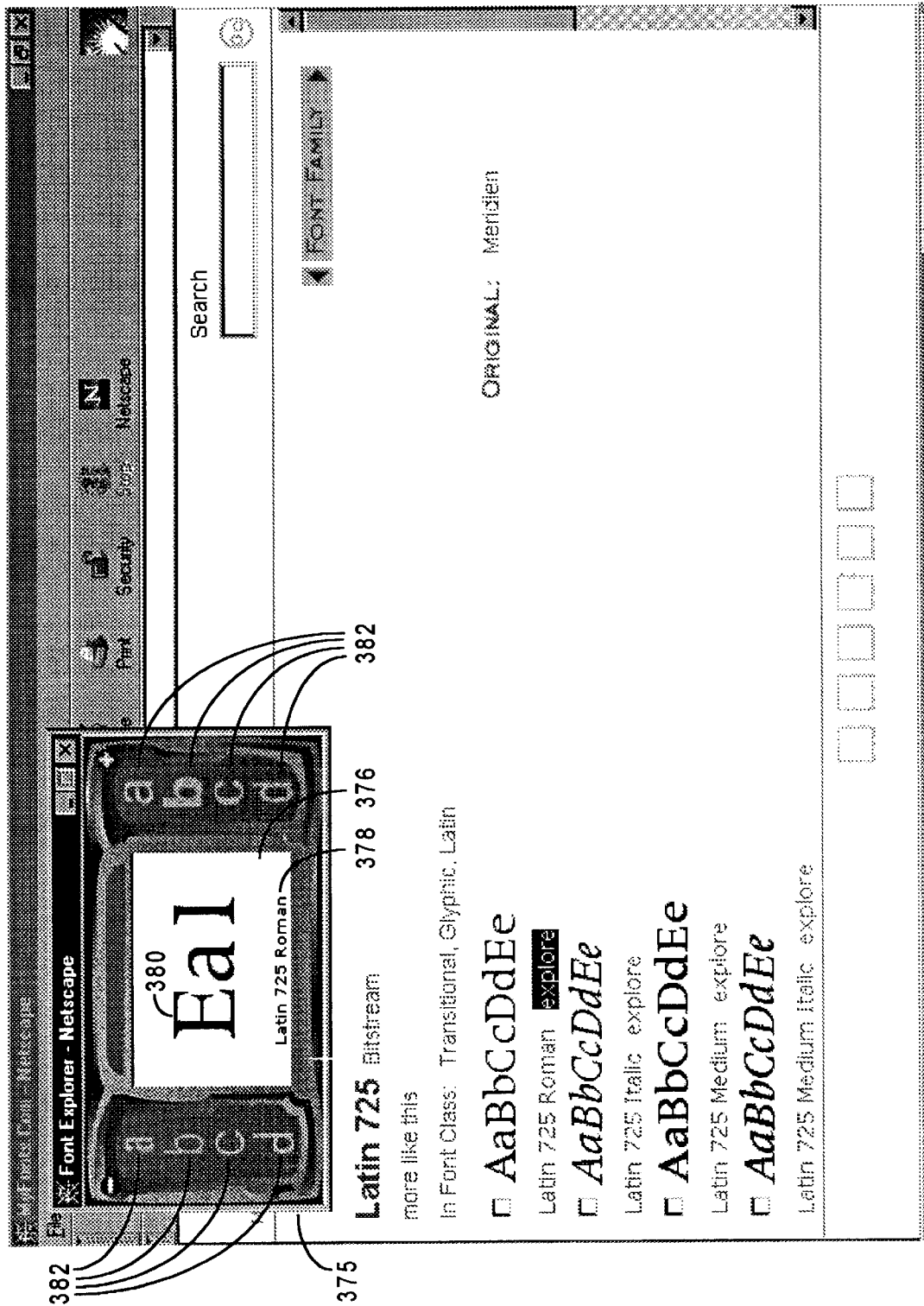
FIG. 55 is a screen shot of the explore page of the font store web site, shown over the font-family page shown in FIG. 53.

As is also indicated in FIGS. 13 and 55, the explore page also includes directional controls 382 for enabling a user to select a direction in font space relative to the currently selected font. In the example shown, there are eight directional controls 382, with an increment and a decrement control associated with each of four font attribute dimensions. Each of the four directional controls on the left side of the explore window of FIG. 55 are used to decrease the value of a respective font attribute value, and each of the four on the right side are used to increase the value of such a font attribute value. In this example the top-most controls 382, represented by the letter "a" on both the right and left of the explore page, relate to the width of the font, that is how wide the maximum horizontal extents of its individual characters are. The controls 382 represented by the letter "b" on both the right and left sides of the explore page, increment and decrement the weight of the font, that is, the thickness of the strokes that define its shape. The controls 382 represented by the letter C are used to increment and decrement the value of the contrast attribute, that which determines the difference between the widest and narrowest parts of its strokes. Finally the controls 382 represented by the letter "d" are used to increment and decrement the value of the x-height parameter. This is the parameter which determines the height of the top of most lowercase letters relative to the top of most uppercase letters. The four font attributes, width, weight, contrast, and x-height, which can be increment or decrement by the controls 382, define a four dimensional font space in which different fonts will be located at different positions as a function of their respective values for each of these four attributes.

As shown in FIG. 13, if a user selects one of the eight directional controls 382, steps 384 and 386 of the browser upload a request for an explore move in the specified direction from the currently selected font, which will be responded to as described below with regard to FIG. 16. If the user clicks on the currently-selected-font window, steps 388 and 390 upload a request for the currently selected font's first font-family page, which will be responded to as described above with regard to FIGS. 10 and 11.

Figure 57:
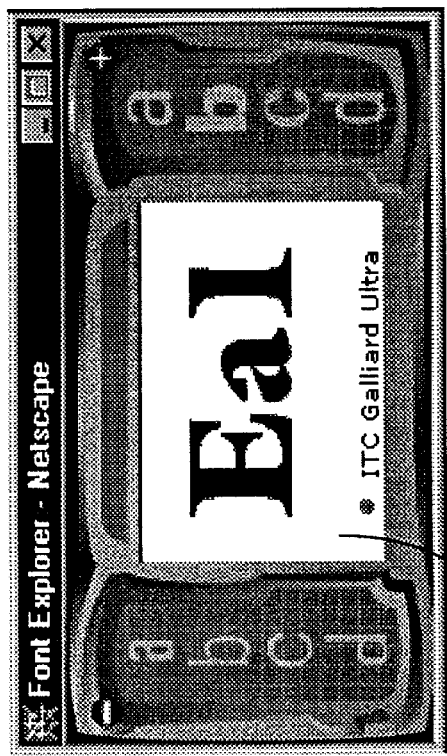
FIGS. 57 through 60 are screen shots of the explore window shown in FIG. 55 as a user selects its controls to navigate through the four dimensional font attribute space.

In the example of the figures, it is assumed the user clicks on the increase width control 382A, as is indicated in FIG. 57. This causes steps 384 and 386 of FIG. 13 to upload a request for an explore move in the positive width direction.

FIG. 16 shows that when the font store server receives request for an explore move, step 400 causes steps 402 through 406 to be performed. Step 402 find a target point in font attribute space having a location equal to that of the currently selected font specified in the explore move request plus a standard length in the attribute direction specified in the request. Next step 404 make the font which is closest to the target point the new currently selected font. If the previous currently selected font is the closest font to the target point, it will be the new currently selected font. Then step 406 download to the explore window a currently-selected-font page for the currently selected font selected in step 404.

Figure 56:
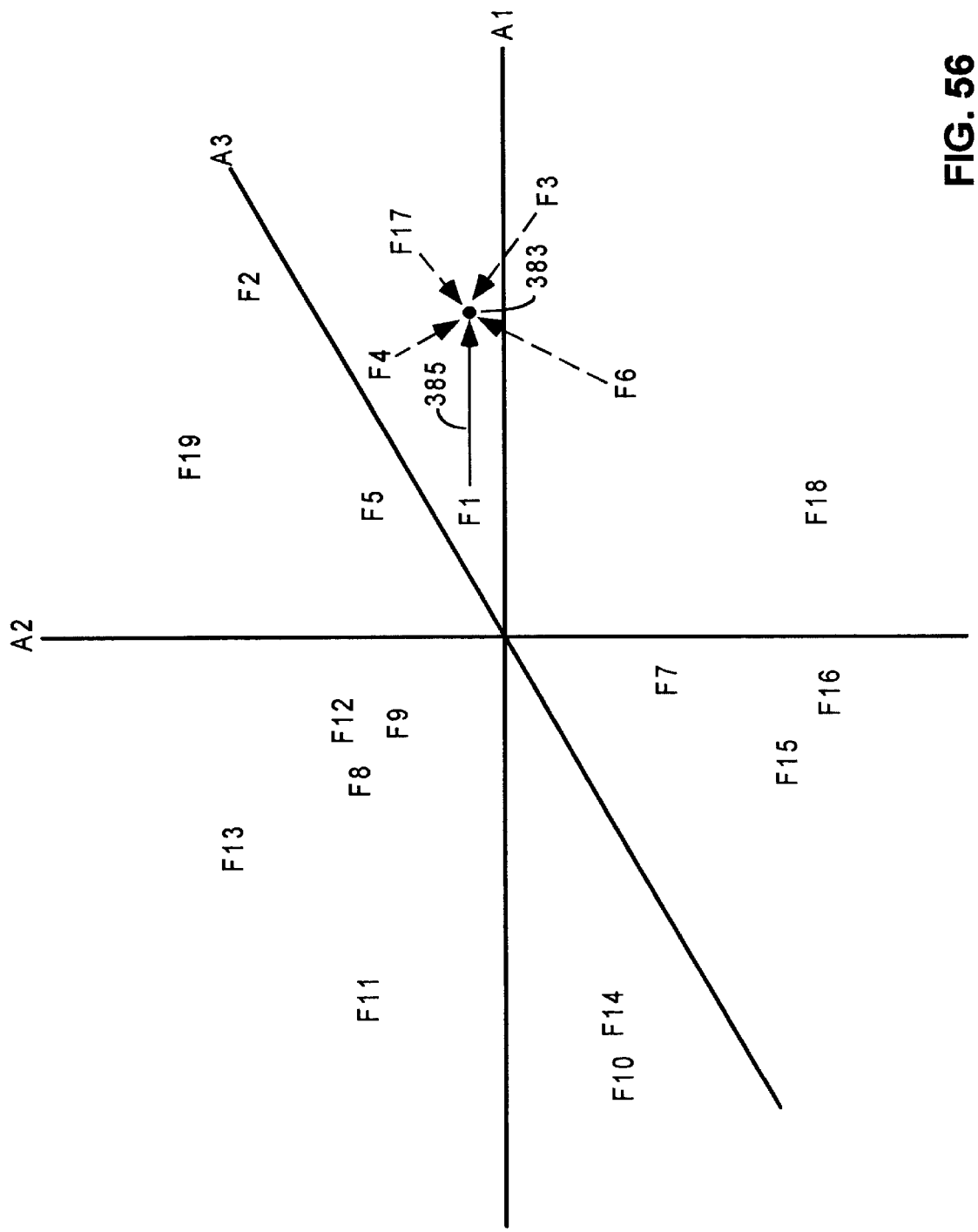
FIG. 56 is a schematic representation of three of the four attribute dimensions of a font attribute space which can be navigated by the explore window of FIG. 55.

FIG. 56 is a schematic representation of three of the four attribute dimension defined by the direction controls 382 in FIGS. 55 and 57–61, with each of the three axes A1, A2, and A3 in FIG. 56 representing one of the four font attributes, and with the labels F1–F18 representing the location of individual fonts in that space, as determined by the values of the four attributes for each such font. In this figure it is assumed that the currently selected font is font F1. When a user selects one of the controls 382, step 402 of FIG. 16 finds a location 383 in the multi-dimensional font space with is removed from the location of the currently selected font by a standard increment in length, illustrated by the arrow 385, in the direction defined by the selected control. Then step 404 of FIG. 16 finds the font which is closest to that new point.

Figure 58:
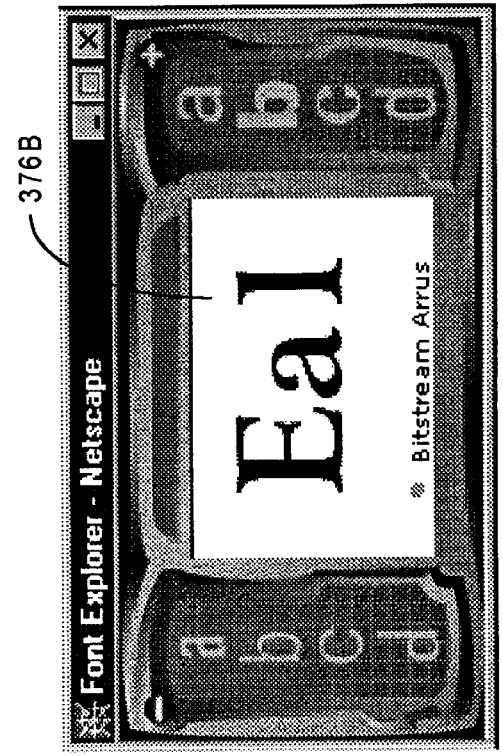
Figure 59:
Figure 60:
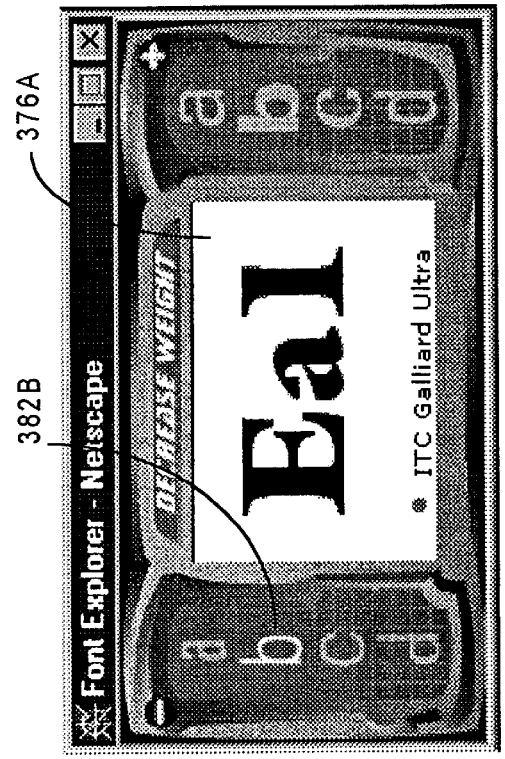
Figure 61:
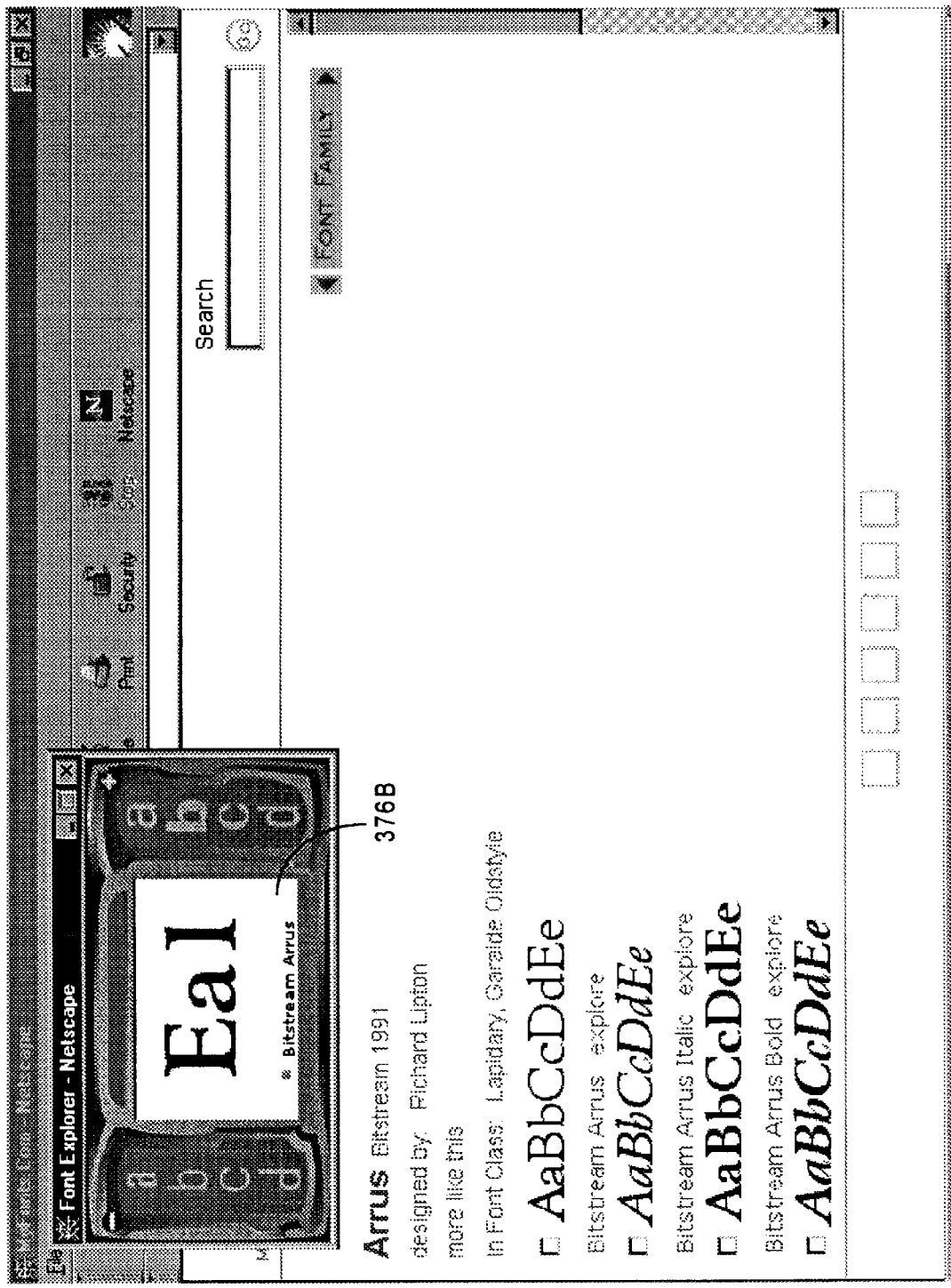
FIG. 61 is a screen shot of the font-family page of the font store web site for a font family selected by clicking on the explore window shown in that figure.

In the example shown in FIGS. 57–61, after the user clicks the increase width control 382A as indicated in FIG. 57, the steps of FIG. 16 will cause the server to select ITC Gallard Ultra font as the new currently selected font and to download a new currently-selected-font page 376B shown in FIG. 58 for that font. Then in FIG. 59 the user selects the decrease contrast control 382B. This causes the steps of FIG. 16 to select Bitstream Arrus as the new currently selected font and to download a new currently-selected-font page 376B for that font, which will then be displayed in the explore window as shown in FIG. 60. In all the steps shown in FIGS. 57 through 60 the font family page for the Latin 725 page shown in FIG. 55 will remain displayed behind the explore window 375. But it is assumed in the example that the user clicks on the currently-selected-font window 376B shown in FIG. 60. As indicated in steps 388 and 390 of FIG. 13, this uploads a request for the first font-family page for the currently selected font, which, in this case, is Bitstream Arrus. As a result, the first font family page for the Bitstream Arrus page will be downloaded and displayed, as indicated in FIG. 61.

This example shows how one aspect of the present invention allows a users to select a font and then navigate relative to it in a selectable succession of dimension in a multidimensional font space, seeing character-font shapes of the closest fonts as the navigation proceeds. In the example shown in figures so far, the user has been able to browse to find a selected font whose characteristics he liked, and then navigate to find a wider font, but when that wider font had to thick a weight, to navigate from it in a different direction to find a relatively wide font which had thinner strokes.

FIGS. 17 through 24 and 62 through 65 are used to describe the Identafont aspect of the present invention. This is the uploaded-font-matching aspect of the invention. It allows a user to upload an image of the character-font shapes of a font and have the font store server perform pattern matching on those shapes to find a set of one or more fonts available from the font store which have similar character-font shapes. The user can request the first page of this function by selecting the Identafont link 248C shown at the bottom of most of the font store's web pages.

As shown in FIG. 17, when the font store server receives request for the first Identafont page, steps 408 and 410 download that page.

Figure 62:
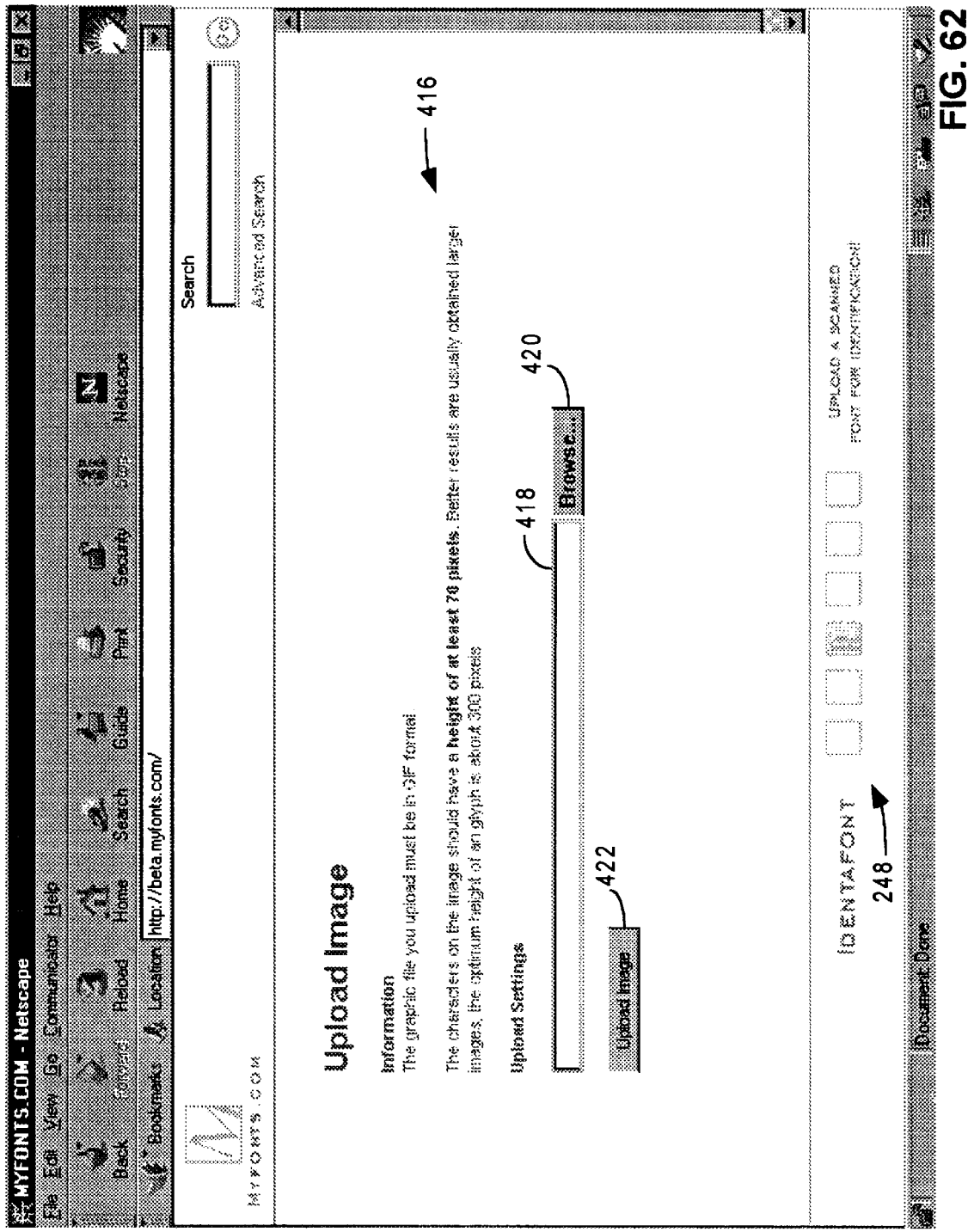
FIG. 62 is a screen shot of the initial Identafont page of the font store web site.

FIG. 18 shows that when the browser receives this page, step 412 causes steps 414 through 434 to be performed. Step 414 displays the first Identafont page as shown in FIG. 62. This page includes text 416 describing the Identafont process and prompting the user to specify a GIF image file of character-font shapes of a desired font for use by that process; a file name control 418, which in the example of FIG. 62 is an editable HTML form field; a browse button 420, which, if clicked, brings up a standard browse window which allows the user to selected a file in the client computer's file system and insert its path into the file name control 418; and an upload button 422. The page also includes the selectable links 248 to the font store's major pages.

If the user selects the browse button, steps 426 and 428 brings up a standard file browse window which allows the user to selected any file in the client computers file system and insert its path into the file name control 418.

If the user selects the upload button, step 430 causes steps 432 and 434 to be performed. Step 432 checks to see if the text in the file name edit box contains the proper form for a file name, and if so it causes step 434 to upload a request for an upload-acknowledge page. This request, like many of the requests in the current embodiment of the present invention is actually a request for service by a CGI script. The body of the request's message includes the contents of the named file, which should, if the user has selected properly, be a GIF image of character-font shapes of a desired font.

It should be noted that in other embodiments of this aspect of the invention virtually any types of image file could be used to upload an image of a font to be matched, and the invention is not limited to the use of GIF files. It should also be noted that in other embodiments of the invention a client could upload a URL of an image file on a different server containing a desired font, such as the URL of a GIF image included in another web site visited by the user, and the server could upload that URL's image directly from the other server.

As shown in FIG. 19 when the font store server receives a request for an image-upload-acknowledge page, step 436 causes steps 438 through 440 to be performed. If an image contained in the body of the request is successfully uploaded, steps 438 and 439 store that image in conjunction with a client ID. This ID is used to establish a relationship between the stored image and the individual client computer from which it came. This is necessary since the font store server will often be communicating with many different clients at one time. Then step 440 generates and downloads an image-upload-acknowledge page which includes the uploaded image if an image was successfully uploaded from the request, along with a client ID cookie.

Figure 63:
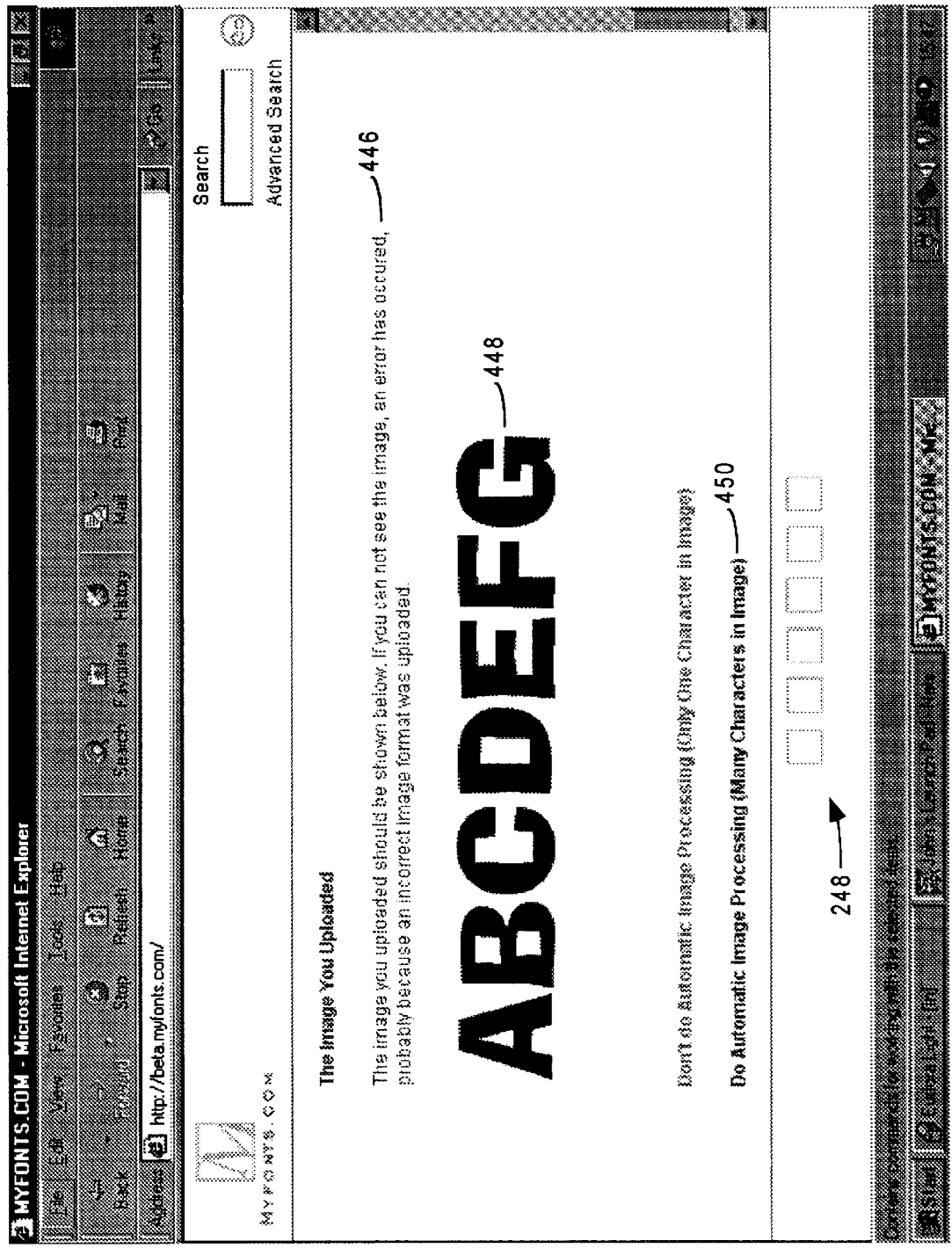
FIG. 63 is a screen shot of an image-upload-acknowledge page generated by the Identafont process of the font store web site.

FIG. 20 indicates that when the browser receives the downloaded image-up load-acknowledge page, step 442 causes steps 444 through 456 to be performed. Step 444 displays the downloaded page as indicated in FIG. 63. The page includes text 446 describing the page; a copy 448 of the uploaded image, if it was successfully uploaded; a selectable next link 450 (called "Do Automatic Image Processing" in FIG. 63); and the links 248 to the font store's major pages. If a user selects the next link 450, steps 454 and 456 upload a request for the font store's recognition-results page with the client ID cookie downloaded with the image-upload-acknowledge page.

As show in FIG. 21, when the font store server receives a request for the font store's recognition-results page, step 458 causes steps 460 through 464 to be performed. Step 460 performs character-font shape recognition on the uploaded image which it has previously stored in conjunction with the client ID cookie contained in the request.

There are multiple ways of performing such character-font shape recognition. In the embodiment of FIG. 1 a relatively simple method is used which tends to require a relatively strong contrast between the character-font shapes and their background and a relatively constant coloring for such shapes and their background to work well. It operates by detecting edges in the image at which there are large discontinuities in color or darkness value and using such edges to define the outlines of potential character-font shapes. It then matches such potential shapes against a set of known character-font shapes from a plurality of different fonts stored on the server to guess which character each character font shape represents. Currently this character-font shape recognition method can only recognize the shapes of individual characters if they are not connected together and it cannot recognize the shape of characters which are made of two or more disconnected parts, such as is normally the case with lower case "i" and question marks.

In other embodiments of the invention, other methods of character-font shape recognition could be used. For example, users could be allowed to mark areas of an uploaded image associated with a given character-font shape and perhaps even to help trace all or a portion of the edge of such characters. This would help the system deal with fonts in which a single letter has separated parts, as well as fonts in which different characters are connected. It would also help make it easier to recognize character-font shape edges in images where the color difference between characters and background is less clears. Alternate embodiments could also allow a user to indicate which character a given character-font shape represent by typing that character in, selecting it from a pull down menu, or even entering it by speech recognition. This would also make the character-font shape recognition process work better because knowledge about what characters are represented in a given portion of an image would decrease the amount of informational searching a computer would have to perform to recognize a character-font shape. In other embodiments of the invention other techniques from the fields of pattern matching could be used to improve the character-font shape recognition used by the font server.

Once step 460 have found a set of possible character-font shapes, step 462 makes a list of the images of such shapes, and step 464 generate and download a recognition-results page including images of the listed character font shapes.

Figure 64A:
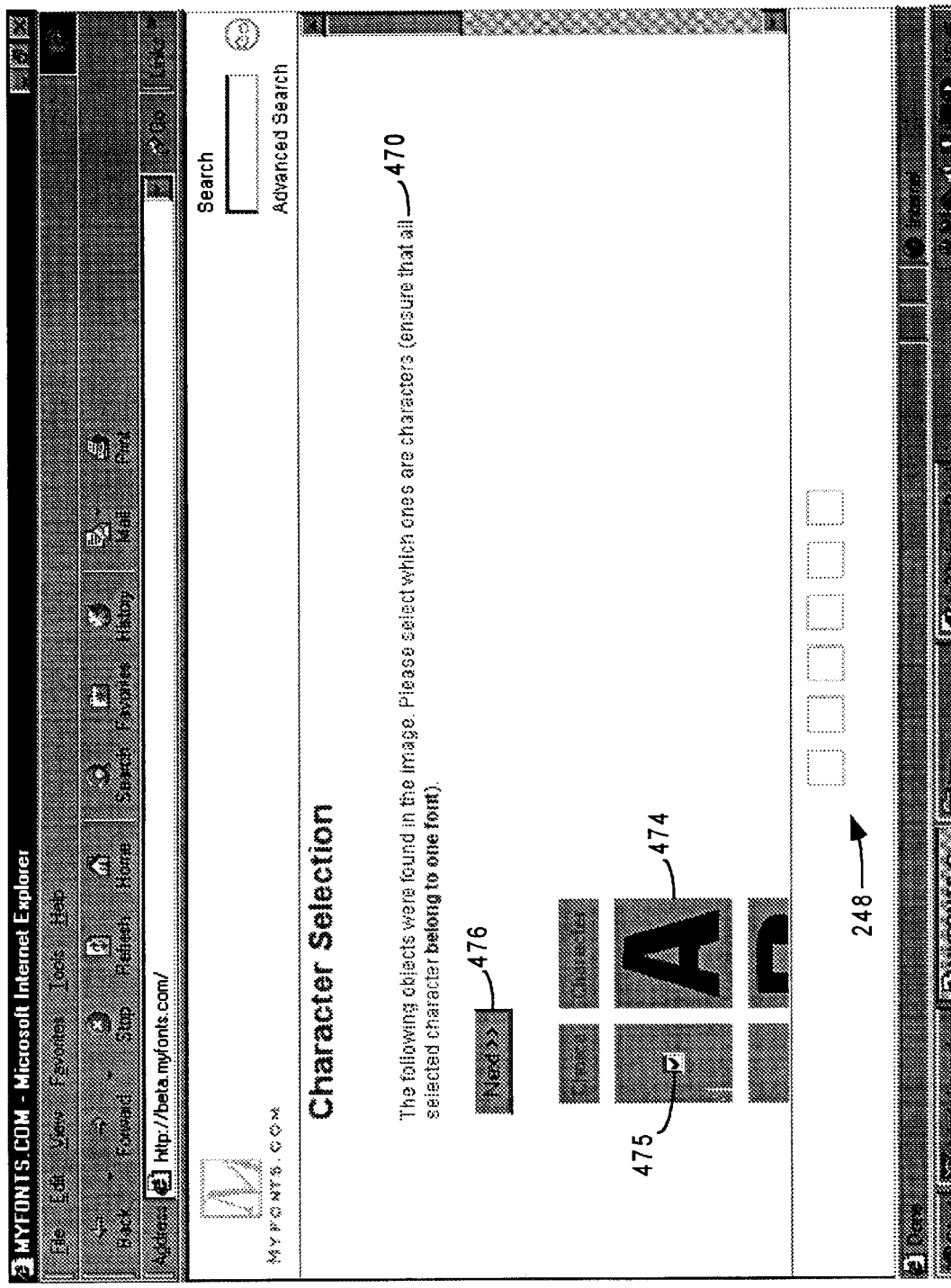
FIGS. 64A and 64B are screen shots of a recognition-results page generated by the Identafont process of the font store web site.
Figure 64B:
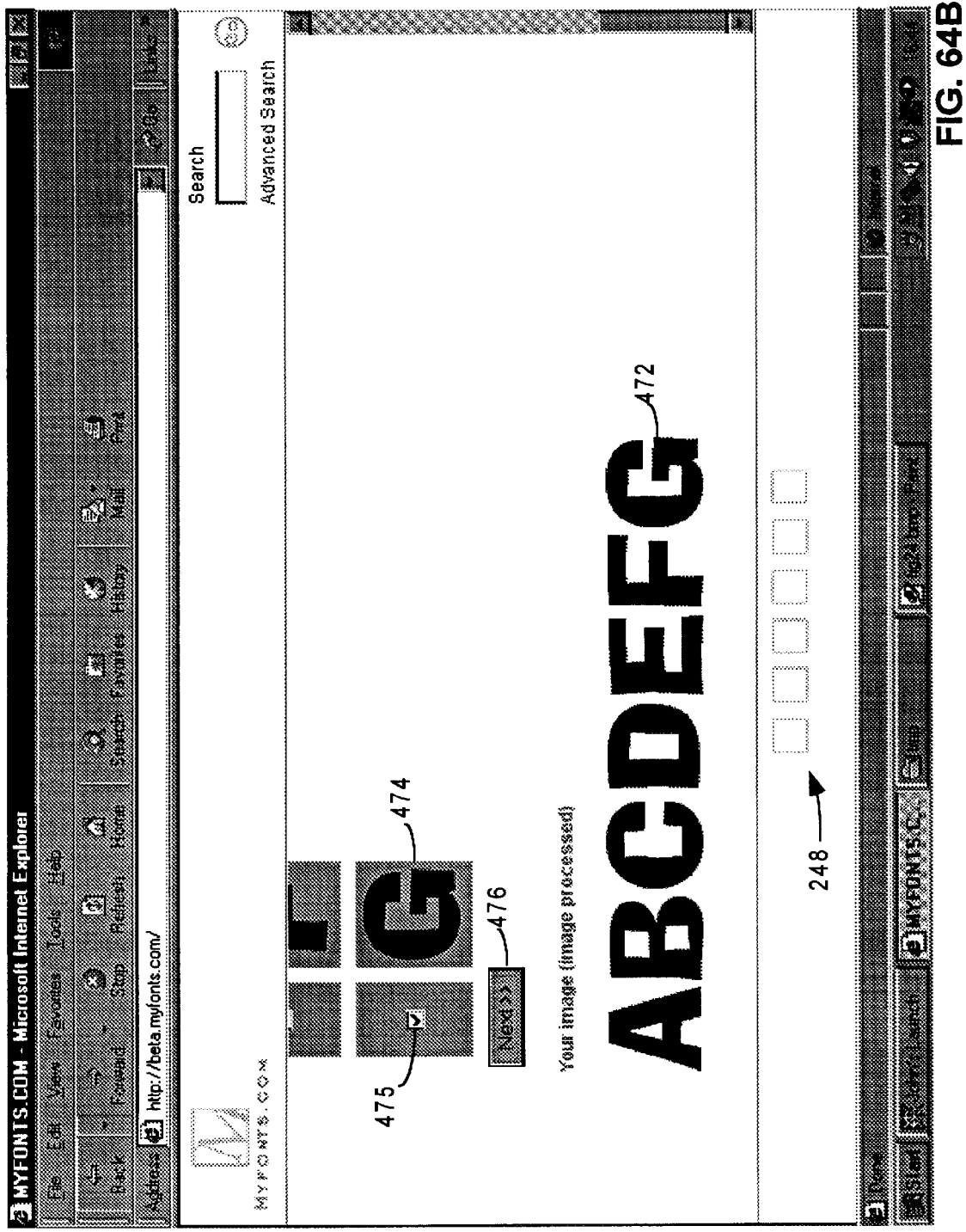

FIG. 22 shows that when the browser receives such a recognition-results page, step 466 causes steps 468 through 482 to be performed. Step 468 displays the page as indicated in FIGS. 64A and 64B. This page includes text 470 describing the contents of the page; a copy 472 of the uploaded image showing only that portion of the image recognized as character-font shapes; a list of images 474 of the character-font shapes found in the image; a check box 475 next to each image, a single "next" button 476; and the links 248 to the font store's major pages.

If a user click on the next button 476, step 480 and 482 cause the browser to upload a request for a match-results page, which request includes a list of all the character-font images 474 whose corresponding check boxes 475 have been checked, indicating that the user considers them to be valid character-font shapes of the font for which he is seeking a match.

As shown in FIG. 23, when the font store server receives request for a match-results page, step 484 causes the test of step 486 to be performed. Step 486 tests if the request contains a client ID cookie matching that for which recognized uploaded character-font shapes have been stored on the server. If so, steps 488 through 492 are performed. Step 488 uses the list of user selected character-font shape ID contained in the request to obtain a corresponding set of character-font shapes which it has stored for the client. Then step 490 performs pattern matching between the user selected character-font shapes against character-font shapes of fonts stored on server. Finally step 492 generate and download a match-results page including the results of this pattern matching.

The pattern matching of step 490 can be performed in many different ways. One relatively simple way is to normalize the size of the recognized character-font shapes to be matched to fit the standard size of set of character-font shape templates. Then these normalized images are each matched against a set of such templates which represent character font shapes from different fonts available for download from the font store for the character associated with each such normalized character-font image by the recognition process of FIGS. 21 and 22. This match of each stored font can be scored as a function of the average percentage of its template image's area which the same characteristic of being either inside or outside of the given character-font shape as the corresponding portion of the area of the normalized character font shapes against which it is compared.

In other embodiments of the invention virtually any other method of shape matching could be used. For example, the pattern matching in other embodiments of the invention could include extracting the edges of character-font shapes and comparing the shape of those edges, or extracting higher level features from character-fonts shapes and comparing those features.

FIG. 24 shows that when the browser receives a match-results page from the font store server, step 494 causes steps 496 through 528 to be performed. Step 496 displays the match-results page as shown in FIG. 65. This page includes text 498 which describes the meaning of the downloaded match results; a copy 500 of the recognized portion of the uploaded image, so the user can compare its shapes with those of the best scoring fonts, and a list 502 of the best scoring font (only one of which fonts is shown in FIG. 65), showing the fonts in order of their match score. This list displays for each best scoring font: a match score 504; a selectable font name 506; a selectable image 508 of character-font shapes from the font; a test drive link 510; a font family link 512; and an explore link 514. The page also includes the links 248 to the font store's major pages.

If the user selects the font name 506, character-font shapes 508, or font family link 512 for a given font, steps 518 and 520 will upload a request for the first font-family page for the given font. If the user selects the test drive link 510 for a given font, steps 522 and 524 request the test-drive page for the given font. If the user selects the explore link 514 for a given font, steps 526 and 528 upload a request for an explore page for the given font.

As can be seen from the above, the Identafont aspect of the invention allows a user to select fonts similar to a font which he or she has seen used by someone else. The user can obtain images of a desired font by scanning images of a typed or printed font into a document scanner. He or she can obtain such images by typing text from a font on his or her computer and then converting that text to an image file. A user can obtain images for fonts seen on web pages by taking screen shots of them, or saving the actual image files from such web sites. Identafont can not only be useful in attempting to find a font which is exactly like that of the uploaded image, but also finding fonts which are similar, but purposely different from such fonts. This can be done by using Identafont to find a set of font similar to an uploaded font, and then either selecting one of the best scoring fonts which has differences from the uploaded font, or using the explore, font-family, or more-like-this pages to find similar, but different, fonts.

FIGS. 25 and 26 describe the test drive aspect of the font store. The user can generate a request for this feature either by clicking on the test drive link 510 of the match-results page, as shown steps 522 and 524 of FIG. 24, or by clicking on a character-font shape image 328 in the font-family page, as indicated in step 346 and 348 of FIG. 11.

As shown in FIG. 25, when the font store server receives a request for a test-drive page, step 530 and 532 generate and download a test-drive page for a font specified in the request. This download page will use the font size and test text, if any, specified in the request. If either of these parameters are not specified in the request, the server will use default values for them.

Figure 66:
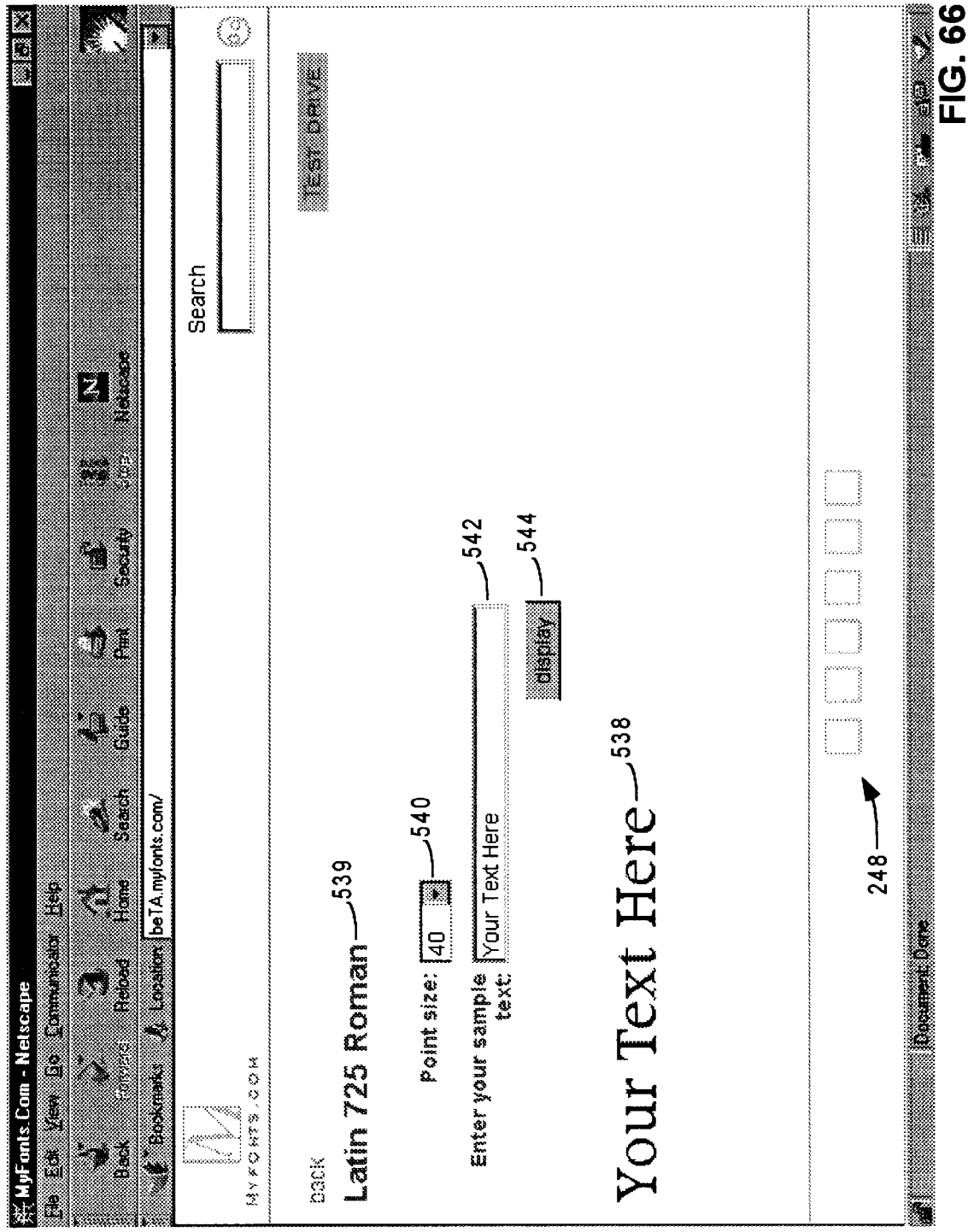
FIGS. 66 and 67 are screen shots of test drive pages generated by the font store web site.

FIG. 26 shows that when the browser receives the download of such a test-drive page, step 534 causes steps 536 through 550 to be performed. Step 536 displays the page is indicated in FIG. 66. This display includes an image 538 of the current test text in the current font and font size; the name of the currently selected font 539; a font size control 540 showing the current font size; a test text control 542 showing the current test text; a display button 544; and links 248 to the font store's major pages.

Figure 67:
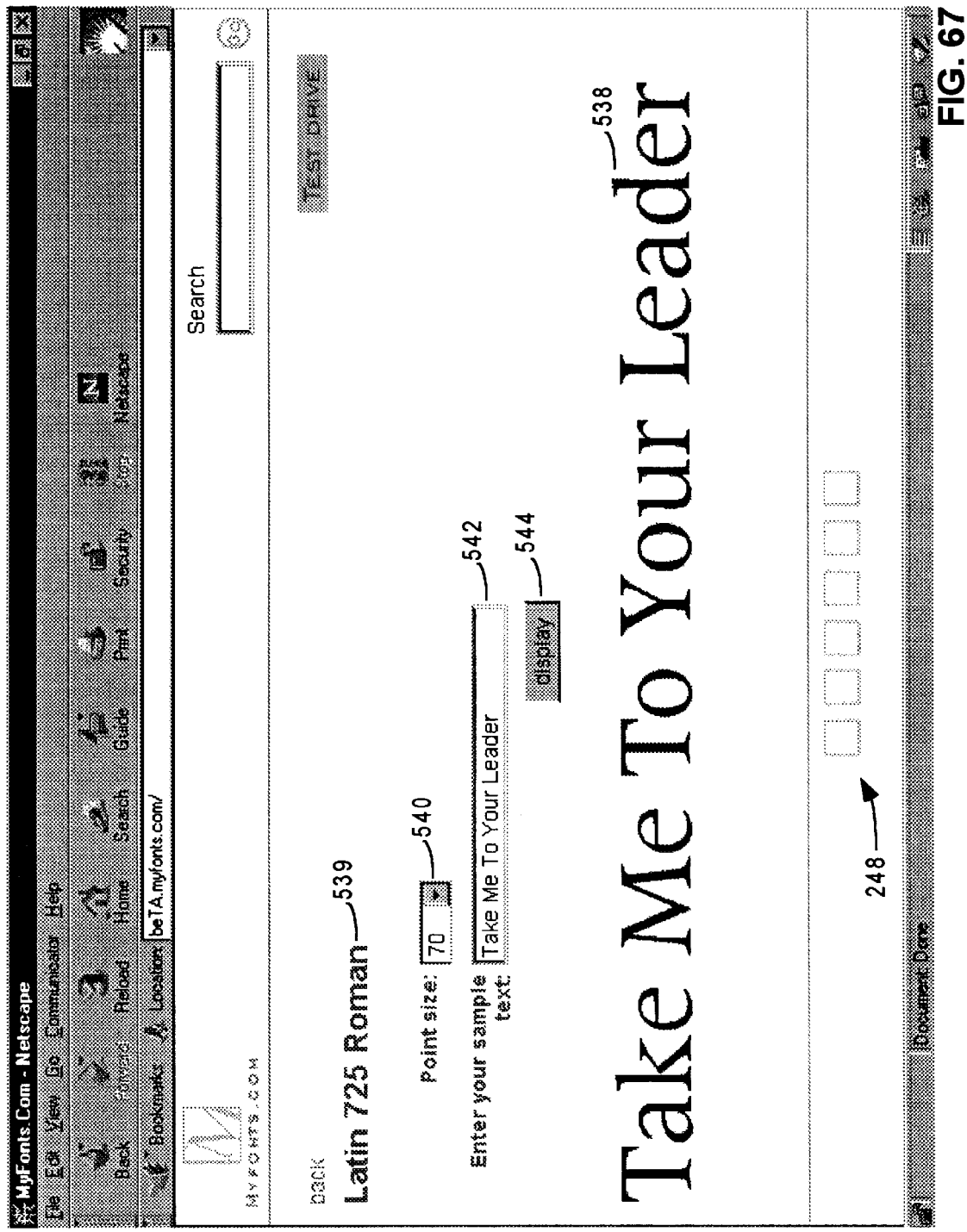

If a user selects the display button 544, steps 548 and 550 will upload a request for a test-drive page for the current font, font size and test text indicated by the font name 539 and the controls 540 and 542, respectively. This will cause the server to generate and download, and the browser to display, a new test-drive page with a new text image. For example, the test-drive page shown in 66 has the default values for both font size and test text. If the user enters the values for point size and test text shown in the controls 540 and 542, respectively, shown in FIG. 67 the server will download and the browser will display the currently selected text with those user-entered values for font size and test text, as shown in FIG. 67. This is valuable because it helps the user see how a given font will look at different sizes and with different combinations of characters.

FIGS. 27 and 28 relate to the more-like-this feature of the font store web site. As described above with regard to steps 350 and 352 of FIG. 11, if the user selects the more-like-this link associated with a given font family's font-family page, the browser will upload a request for a more-like-this page for the given font family.

As shown in FIG. 27, when the font store server receives a request for a more-like-this page, step 552 causes steps 554 and 556 to be performed. Step 554 performs a multi-dimensional closeness search in a font space relative to the font family specified in request. It does this to generate a list of best matching font families.

In the font store server of FIG. 1, the more-like-this search is performed in a multi-dimensional attribute space in which the individual attributes are binary attributes associated with one or more of a relatively large number of descriptive labels which can be associated with a font family. The attribute dimension associated with a given label would have a one value if the font family as such a label stored in the server in association with it and a zero if it does not. In other embodiments of this aspect of the invention, the font attribute space could include attributes which had other than binary values, such as integer values.

Once step 554 of FIG. 27 has generated a list of best matching font families, step 556 generates and downloads a more-like-this page having the page number indicated in the request.

Figure 68:
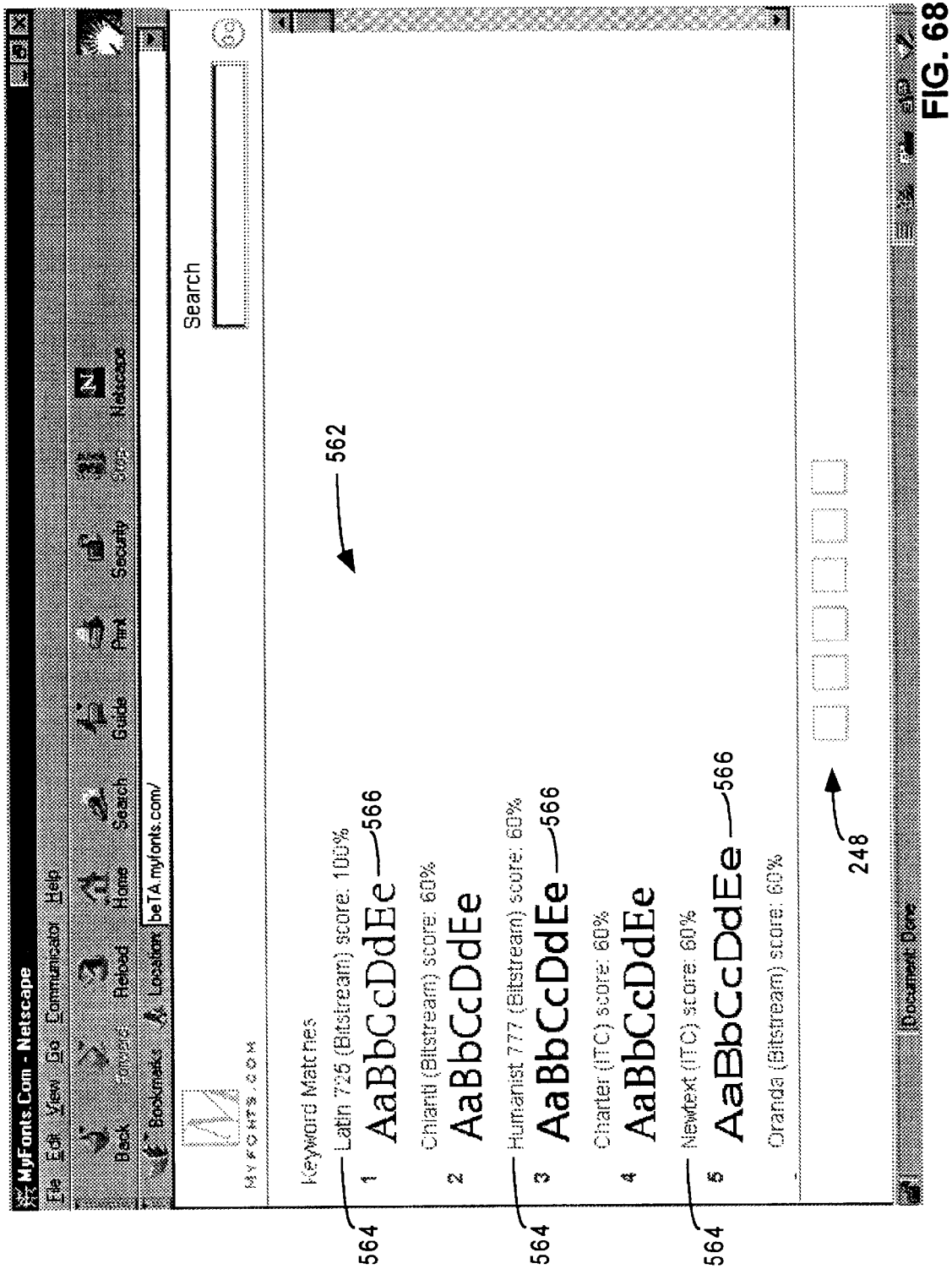
FIG. 68 is a screen shot of a more-like-this page generated by the font store web site.

FIG. 28 shows that when the browser receives the download of a more-like-this page, step 558 causes steps 560 through 578 to be performed. Step 560 displays the page, as shown in FIG. 68. This display includes a list 562 of the best matching font families, displaying for each such font family a font family name 564 and a selectable image 566 of character-font shapes from one font in the font family. As indicated in FIG. 28, the more-like-this page will also include links 568 to one or more numbered pages of search results, if there are too many font families in the search results to be listed on one page. The page also includes links 248 to the font store's major pages.

If the user selects a link to another numbered page of results for the current more-like-this search, steps 572 and 574 will upload request for the associated numbered search results page. If the user selects the character-font shapes 566 of a given font family, steps 576 and 578 will upload a request for the given font family's font-family page from the server.

FIGS. 29 through 37 illustrate steps which allow a user to actually purchase and download fonts which he or she has selected with the help of the font store's font selection aids. A user can initiate this process by selecting links to the my-cart page which exist at various points in the font store web site or by clicking on the add button 322 shown in FIG. 54. Either of these actions will generate a request for the my-cart page.

As shown in FIG. 29, when the font store server receives a request for the my-cart page, step 580 causes steps 582 through 590 to be performed. Step 582 tests to see if a user ID of a user which it records as being currently logged-in is specified in the request from the client. If so, it causes step 584 to add any fonts identified in the request as having been selected for purchase to a shopping cart stored with the user's account on the server, and select all the fonts in that shopping cart as fonts currently selected for purchase. If step 582 does not find the current request is from a logged-in user, steps 586 and 588 select the fonts identified in the current request as fonts currently selected for purchase. In either case step 590 generates and downloads a my-cart page specifying the fonts currently selected for purchase.

Figure 69:
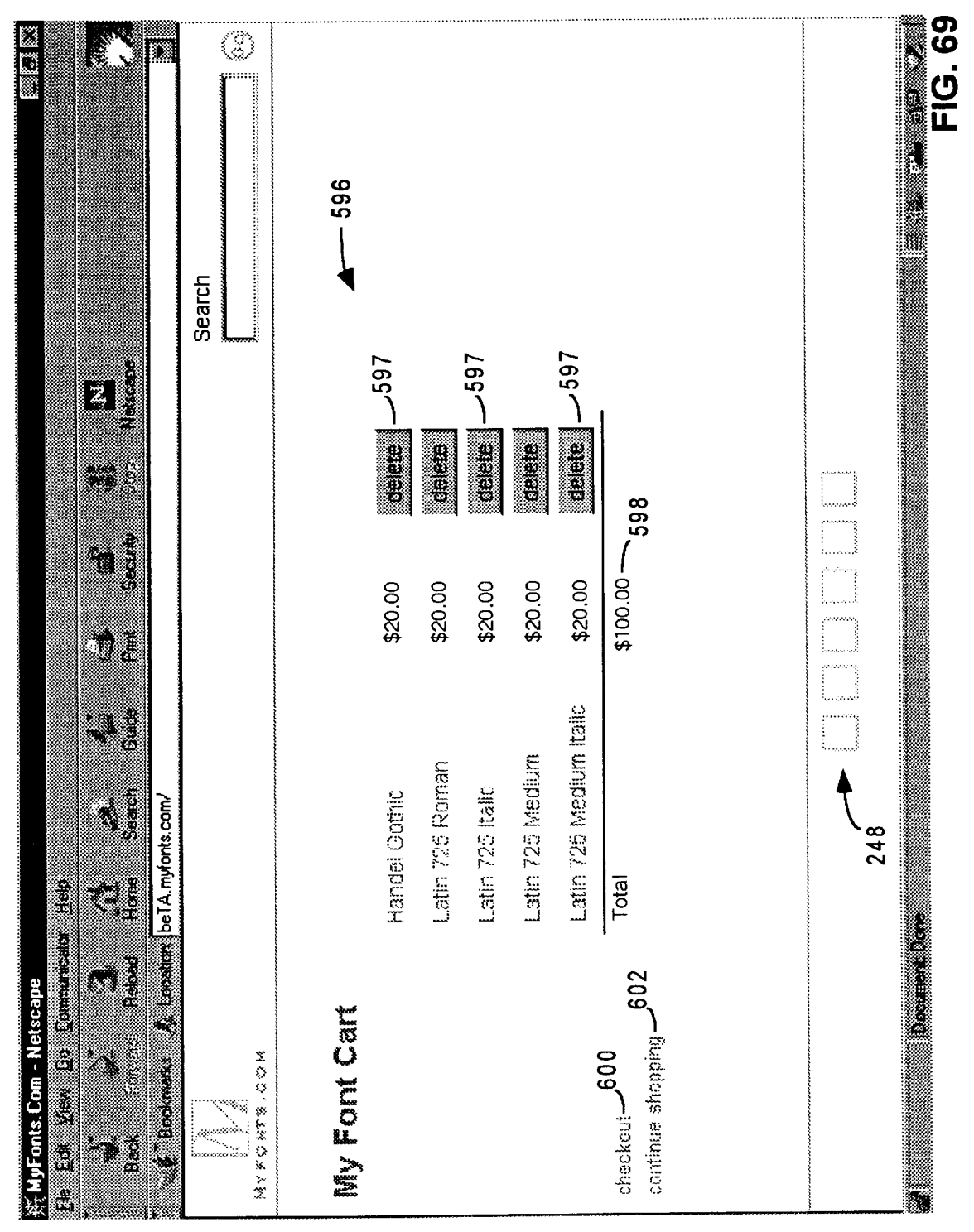

FIG. 30 shows that when the browser receives a downloaded my-cart page, step 592 causes steps 594 through 616 to be performed. Step 594 displays the page as shown in FIG. 69. This display includes a list 596 of all the fonts in the user's shopping cart, showing for each its price and a delete button 597 which allows the font to be removed from the user's cart. The page also displays the total price 598 for all the fonts in the cart, a checkout link 600, a continue-shopping link 602, and the links 248 to the font store's major pages.

If a user selects the delete button 597 associated with a given font, steps 606 and 608 will upload a request for a my-cart page with an indication that the deleted font is no longer in the user's shopping cart. If the user selects the checkout link 600, steps 610 and 612 will upload a request for the checkout page, described below with regard to FIGS. 31 and 34. If the user selects the continue-shopping link 602, steps 614 and 616 will upload a request for the font-family page identified in the lastFontFamilyAdded variable last set in step 356 of FIG. 11, returning the user to the font-family page which was displayed the last time the user pressed the add button 322 (shown in FIG. 54) of a font-family page.

As shown in FIG. 31, when the font store's server receives a request for its checkout page, step 618 causes steps 620 to test to see if the request specifies a user ID which the server has recorded as being associated with a currently logged-in user. If not, step 622 downloads a log-in page. If the client's user is already logged-in, steps 624 and 626 will generate and download a checkout page for the logged-in user specified in the checkout page request.

Figure 70:
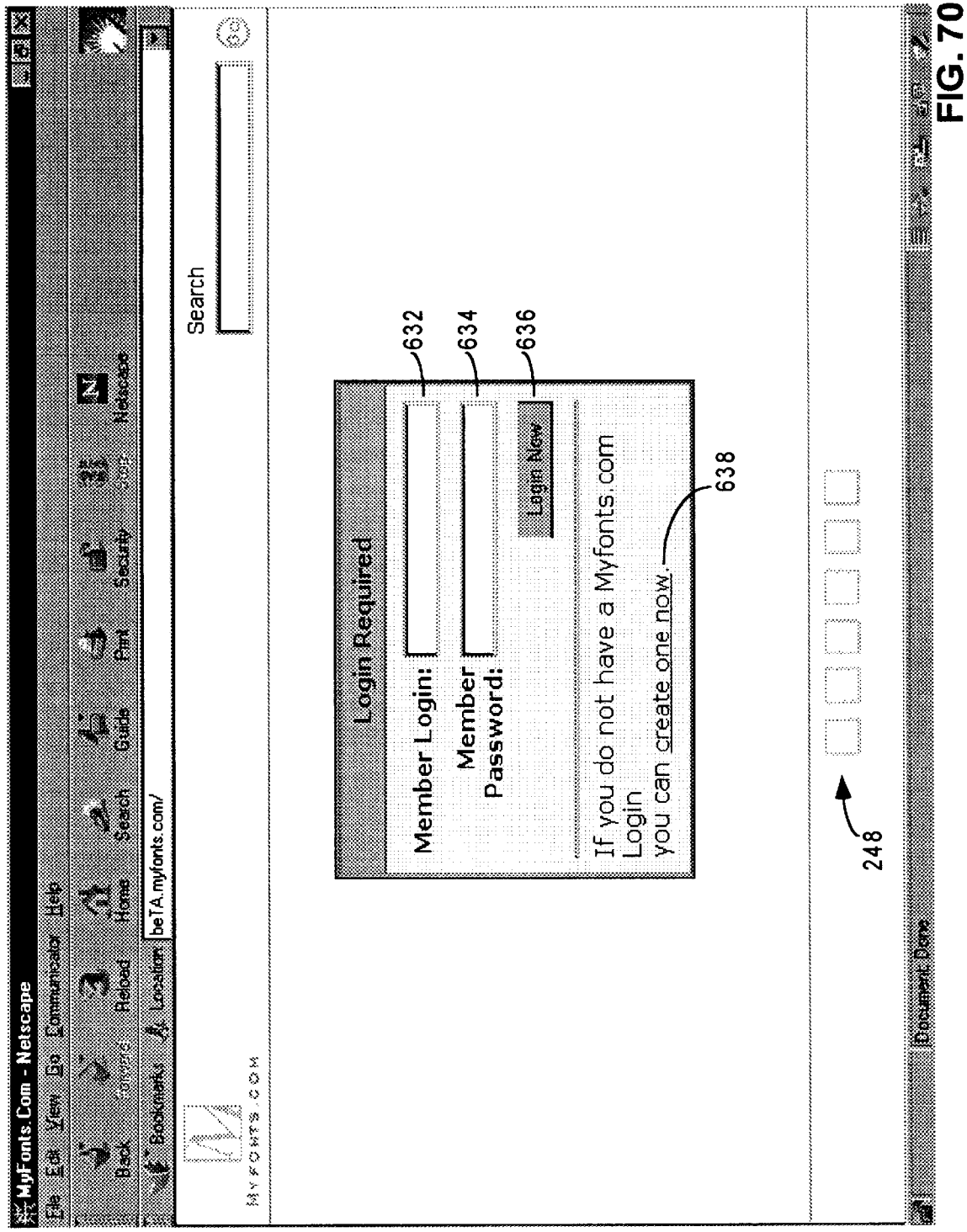
FIG. 70 is a screen shot of a log-in page of the font store web site.

FIG. 32 shows that when the browser receives the download of a log-in page, either from the attempt of a non-logged in user to check out, as discussed in the last paragraph or from other links in the font store site, step 628 causes steps 630 through 644 to be performed. Step 630 displays the log-in page, as shown in FIG. 70. This page includes a field 632 for entering a user name, a field 634 for entering a password, a submit button 636, a link 638 to allow a new user registration; and the links 248 to the store's major pages. If the user presses the submit button 636, steps 642 and 644 will upload a request for log-in processing.

As shown in FIG. 33, when the font store server receives a request for log-in processing, step 646 causes steps 648 and 652 to be performed. Step 648 verifies that the user name and password pair specified in the request are recorded in association with a user ID stored in the server's customer database. If so, step 650 downloads a checkout page for the matching user ID which specified any fonts currently selected for purchase by either the request or the shopping cart stored on the server for the user ID. If the user name and password do not correspond to any of the server's known user ID's step 652 downloads a page informing user of the problem and allowing him to register as a user of the font store web site.

FIG. 34 shows that when the browser receives a checkout page, step 654 causes steps 656 through 668 to be performed. Step 656 displays the checkout page, including a field 658 for entering a user's credit card number; a field 660 for entering a user's credit card expiration date; a purchase button 662; and the links 248 to the font store's major pages. If the user selects the purchase button, steps 666 and 668 will upload a request for checkout processing with the credit card information which has been entered in the fields 658 and 660.

As shown in FIG. 35 when the font store server receives a request for checkout processing, step 670 causes steps 672 through 678 the be executed. Step 672 sends the credit card number and expiration date specified in the request to a credit card processor 170 of the type shown in FIG. 1. If the charge can go through, the transaction processing system 170 will charge the credit card holder's account 176 and credit the font store's merchant account 186 and indicate that the charge went through to the server. If such credit card approval is obtained, steps 674 and 676 will generate and download a font download page. Otherwise step 678 will download an indication that the credit card authorization has been denied.

FIG. 36 illustrates that when the browser receives a font download page, step 680 causes steps 682 through 692 to be performed. Step 682—displays the font download page, which includes text 684 explaining how to download the purchased fonts, link 686 for the download of each of the one or more purchased fonts, and the links 248 to the font store's major pages. If a user selects a given purchased-font's download link, steps 690 and 692 will upload a request for the download of the given font's font file.

As shown in FIG. 37, when the font store server receives such a request for a font download, steps 694 and 696 will download the font file specified in the request.

The explore function described above with regard to FIGS. 12–16 and FIGS. 55–61 allows a user to successively select a new portion of the font space by making a move in one font attribute direction at a time and at each move it displays only the single nearest font to the new location. Thus, each move provides a new relative spatial specification which defines a portion of the font space which includes only one font, and that one font is automatically made the currently selected font from which the next move can be made.

FIGS. 12 through 16 and 55 through 61 describe one embodiment of the present invention's explore feature. In this embodiment the user can explore a multi-dimensional font space by repeatedly selecting a spatial specification, in the form of one of the direction controls 382 shown in FIGS. 55–61. Each such spatial specification defines a sub-portion of the font space relative to the currently selected font, in this case, the portion of the font space comprising the single font which is closest to a point removed from the currently selected font in the selected direction by the standard distance 385 shown in FIG. 56.

There are many other ways in which the invention's explore function could allow a user to explore a multi-dimensional font space relative to the location of a selected font. For example, the spatial specification selected at each exploratory stage could define a portion of the font space which includes a plurality of fonts, such as a set of the fonts closest to a given point or region in the space. The spatial specification which defines an individual exploratory move could define spatial regions which selectively provide greater weight or scoring importance on some attributes dimensions than others. For example, the spatial specification could specify a given number of points which are in, or are closest to, a region having different extents in different dimensions of the font space. Furthermore, in other embodiments of the invention the attribute dimensions of the font space used for exploration could include other than the four attributes of width, weight, contrast, and x-height, discussed above with regard to FIGS. 55–61. This could include virtually any combination of font attributes which is desired, including binary (i.e., on/off) attributes as well as ones having a greater range of values. Such binary attributes could include font category, as well as the labels used for the more-like-this searches.

FIGS. 38 through 41 and 71 through 74 illustrate one possible alternate embodiment of the invention's explore feature. According to this embodiment, the font store web site includes links for enabling a user to request a "neighborhood" explore page, which allows the user to specify regions of font space which have user selectable variable extents and displacements in the various attribute dimensions of the font space relative to a currently selected font.

As shown in FIG. 38 when the font store server receives a request for a neighborhood explore page, steps 700 and 702 cause the server to generate and download a neighborhood explore page with the page's current attribute values set to the attribute values of the currently selected font specified in the request, the page's relative attribute ranges set to zero extent around the current attribute values, the maximum number best scoring fonts to be shown set to a default value, and the page number of the best scoring results to be download set to one.

Figure 71:
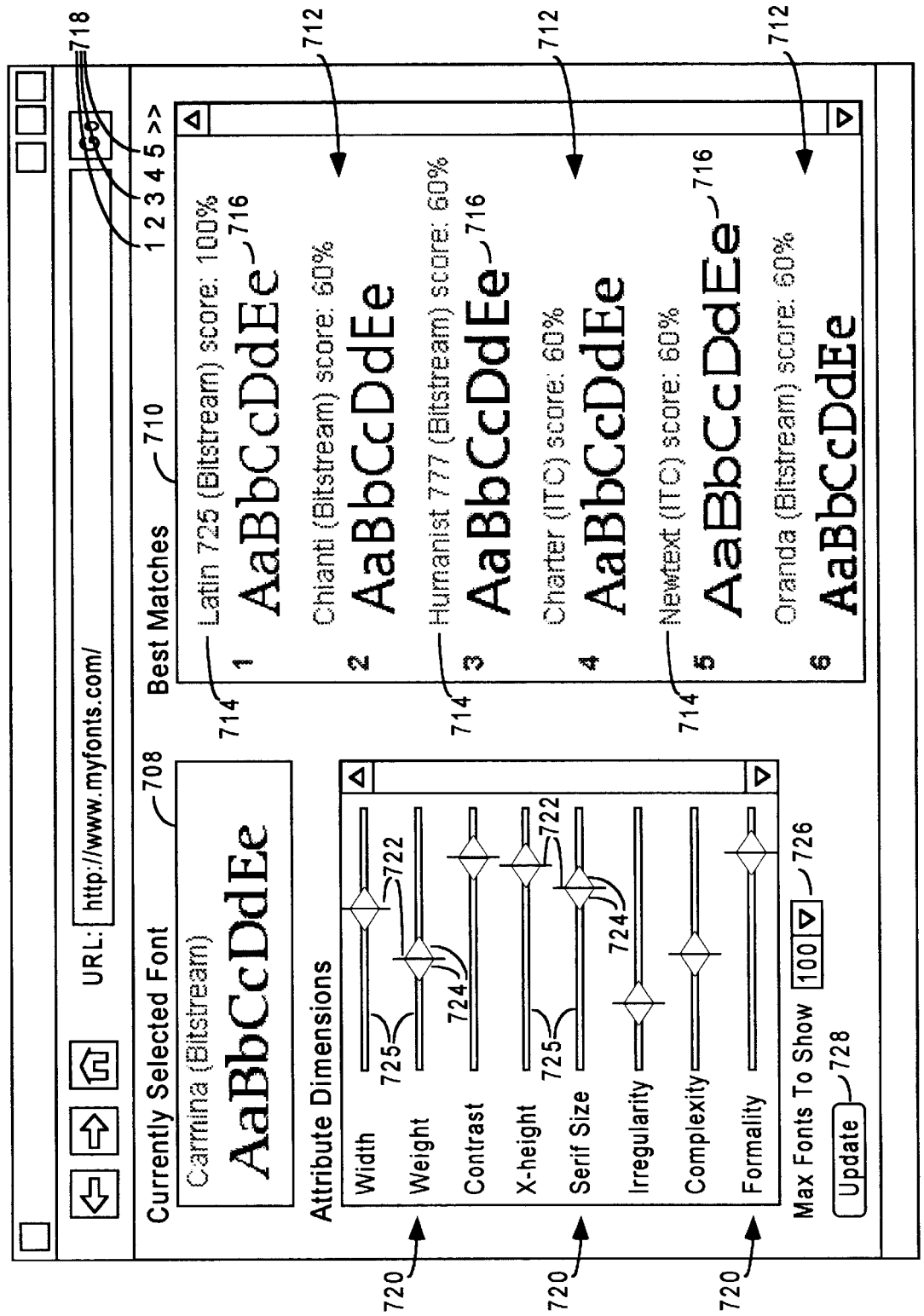

FIG. 39 shows that when the client receives such a neighborhood explore page, step 704 causes steps 706 to 746 to be performed. Step 706 displays the neighborhood explore page as a new full-sized window as shown in FIG. 71. As can be seen from FIG. 71 this page includes a currently-selected-font frame 708, which show a selectable name and a selectable image of character-font shapes from the currently selected font. The page also shows a currently-selectable-font page 710 in a frame which shows which fonts 712 best match the currently selectable font, or a spatial region defined relative to the currently selected font. For each such best matching font, the page displays the font's name 714 and a selectable image 716 of some of its character-font shapes. The neighborhood explore page further includes links 718 to each other page of best matching currently-selectable fonts, and a set of attribute controls 720.

Each attribute control includes an indication 722 of the value of its associated attribute for the currently selected font and two relative range setting controls 724. Each attribute's relative range setting control can be selectively dragged by a user relative to their initial position set by the server in step 703 of FIG. 38 to define a range of values for that attribute along an attribute scale 725 representing the maximum range in the font space for the given attribute. The neighborhood explore page also includes a control 726 for enabling a user to select how many best matching fonts he or she wants selected in each search and an update button 728

If a user selects the update button 728, steps 730 and 732 upload a request for a new currently-selectable-fonts page specifying the currently selected font, relative range values for each attribute, the maximum number of best matches to display, and an indication that the first page of the search results are to be shown. It should be noted that the relative range values are "relative" in the sense that the user can select them relative to the indications 722 of the attribute values of the currently selected font. These values need not be uploaded to the server as relative values, but instead can be uploaded in terms of the absolute attribute values they represent.

As is shown in FIG. 40, when the server receives such a request, steps 748 causes steps 750 and 752 to be performed. Step 750 scores which fonts in the font space defined by the attribute controls of the neighborhood explore page come within, and then are closest to, the spatial range specified by the relative range values specified in the request, and picks the best scoring such font up to maximum number specified in the request. Then step 752 generates and downloads a currently-selectable-fonts page of such best matching fonts having the page number specified in the request.

As shown in FIG. 41 when the client receives the download of such a currently-selectable-fonts page, steps 754 and 756 display that page inside the associated frame of the explore page.

Returning now to FIG. 39, If the user selects a given currently-selectable font by clicking on its character-font shape image 716, steps 734 and 736 make the given font the currently selected font and uploads a request for a new neighborhood explore page specifying the new currently selected font. This will cause a new explore page to be displayed with the new currently selected font in the window 708, with the relative range controls 724 set equal to the attribute values of the new currently selected font, and a list of the closest fonts in the font space to the new currently selected font listed in the currently selectable fonts window 710.

If the user selects a link 718 to a numbered currently-selectable-font page, steps 738 and 740 upload a request for a currently-selectable-fonts page specifying the relative range control values, maximum number of best matches to display, and the selected page number.

If the user selects the currently selected font window 708, steps 744 and 746 upload a request for the currently selected font's first font-family page.

The neighborhood explore page allows a users to select a currently selected font, see its attribute values and see the fonts which are closest to it in font space. The user can go back and forth between selecting different fonts to learn the differences in their values in different attribute dimensions. He or she can also navigate through font space merely by selecting fonts from the currently selectable font window 710 so as to make them the currently selected font and to cause a search in font space for the closest fonts to them. The user can take finer control over the search process by using the relative range controls 724 to define regions in space which extend to different degrees in different dimensions. For example, by expanding the two range controls associated with a given attribute to the opposite ends of the dimension's associated attribute scale 725, the user effectively removes the attribute dimension from effective use in the selection of best scoring fonts for the currently selectable font window, since any value of that attribute will score equally as well against the range of all possible values for that attribute.

FIG. 71 shows how a neighborhood explore window would look after it has first been downloaded and displayed for a given currently selected font, with the relative range controls 724 for each attribute of the currently selected font being set equal to the value of that attribute.

Figure 72:
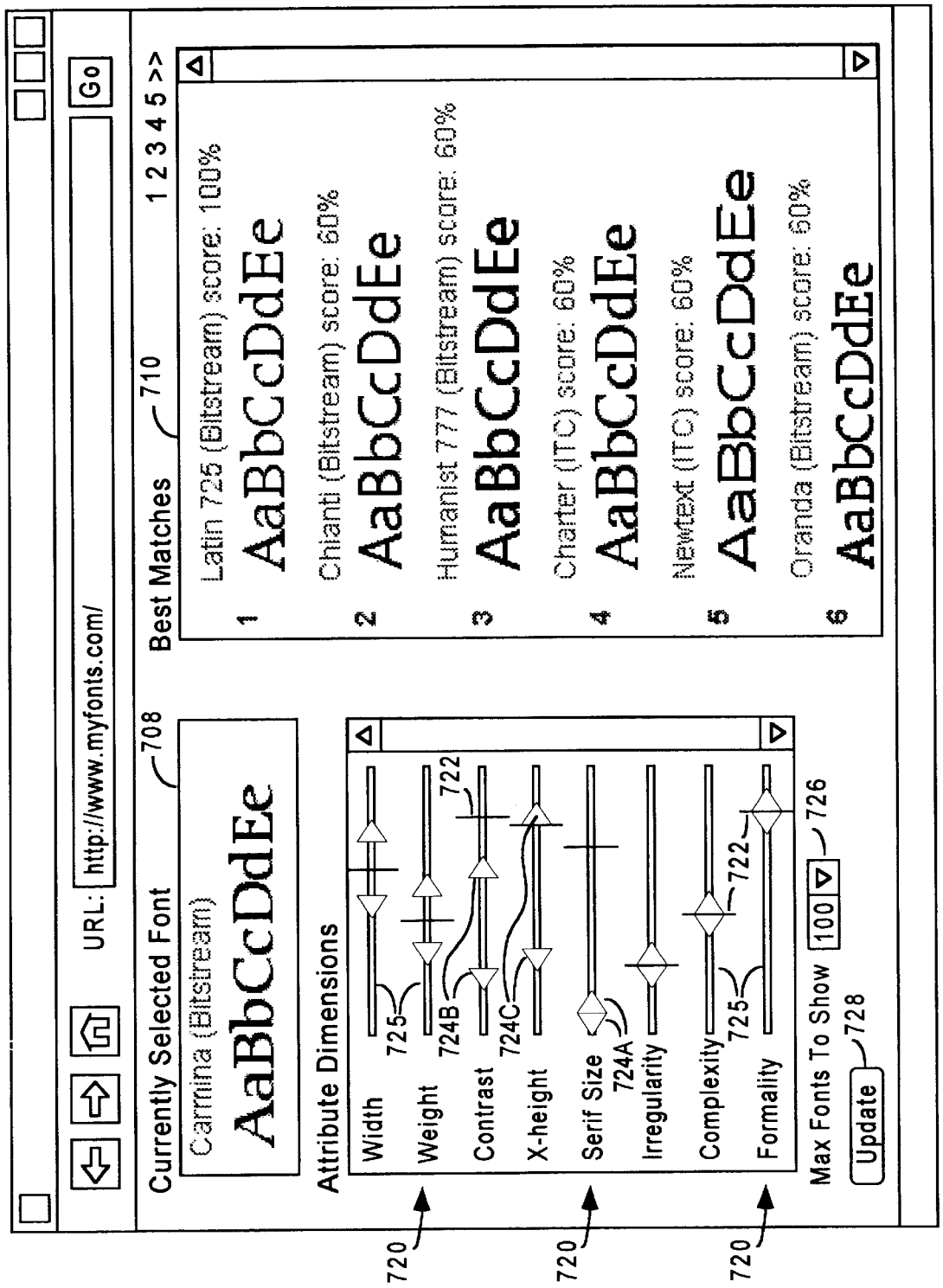

FIG. 72 shows the page after the user has decided to alter the position of some of the relative range controls. The user has set both relative range controls 724A for serif size to zero, indicating he does not want serifs. He has set the relative range controls for Contrast 724B and X height 724C to relatively broad intermediate ranges. Note that even the upper range control 724B for contrast is below the value of that attribute for the currently selected font as shown by the indicator 722A.

FIG. 73 indicates what the neighborhood explore page of FIG. 72 looks like after the user presses the update button 728, and a new currently selectable fonts page 710 has been generated, downloaded, and displayed showing the best matching fonts for the spatial region defined by the relative range control values set in FIG. 72.

FIG. 74 shows what the neighborhood explore page of FIG. 73 looks like if the user selects the character-font shape image 716A of the Square 721 font shown in the currently selectable fonts window 710 of FIG. 73, and a new neighborhood explore page for the new currently selected font has been requested, generated, downloaded, and displayed. As can be seen in FIG. 74 the attribute indicators 722 have been set to the attribute values of the new currently selected font, Square 721, and the relative range controls have also be set to those values.

FIG. 42 illustrates a method 758 of selecting a font. It includes a step 760 of selecting a font using the identafont function described above with regard to FIGS. 17 through 24; a step 762 of selecting the explore function for a given best scoring fonts displayed in the match-results page produced by the Identafont function, such as by selecting the explore link 514, shown in FIG. 65; and step 764 of using the explore page to explore for fonts starting at the given best scoring font. It should be understood that in many embodiments of this method the explore function picked would be one like that described above with regard to FIGS. 38 through 41 and FIGS. 71 through 74 which display a plurality of search results after each move to a new portion of the font space and which require the user to select which of the fonts that best match that new portion should be selected as the basis for the next relative spatial specification.

FIGS. 43 through 49 illustrate alternate ways in which a function somewhat similar to the Identafont function can be performed according to some aspects of the invention. All of these figures show the pseudo-code of FIGS. 18, 23, and/or 24 modified to practice these alternate embodiments, with insertion's underlined and deletions struck through. Step numbers for figures corresponding to FIGS. 18, 23, and/or 24 are identical to the figure numbers shown in those earlier figures, unless the wording of the pseudo-code for that step has been altered.

FIGS. 43 through 45 illustrate an alternate embodiment of the Identafont function in which the user uploads not an image of a font in which he or she is interested, but rather an actual font file for that font. This might be useful if the user has a font file which is not on the font server and wants to find a similar or somewhat similar font in the font store server. FIGS. 43, 44, and 45 correspond to FIGS. 18, 23, and 24 respectively, with the significant changes being marked.

As indicated in FIG. 43, in this embodiment the Identafont first page is identical to that described in FIG. 18, except that step 416A prompts the user to specify a font file for upload, not an image file, as did step 416, and that step 434A uploads a request for the match-results page, since there is no character-font shape recognition for which user feedback is requested.

As indicated in FIG. 44, the server's response to such a request for a match-results page by having steps 490A pattern match the character-font shapes from the font file uploaded with the request against character-font shapes of fonts stored on the server, and then having step 492 generate and download a match-results page.

FIG. 45 shows that when the browser receives the download of a match-results page produced by the steps of FIG. 44, its response is identical to that described above with regard to FIG. 24, except that the step 500A of FIG. 45 displays the name and character-font shapes of the uploaded font file, rather than an image of the uploaded file, as was displayed by the corresponding step 500 of FIG. 24.

FIGS. 46 through 48 illustrate an alternate embodiment of the Identafont function in which the user can specify a desired font with which to start a font selection process by specifying a name of a font known to the server, and then performing a search for one or more similar fonts. FIGS. 46, 47, and 48 correspond to FIGS. 18, 23, and 24, except for the marked changes.

The steps of FIG. 46 are identical to those of FIG. 18 except that a font name control 418A and font browse button 420B are used in place of the file name control 418 and browse button 420 of FIG. 18. As shown in step 428B, selecting the font browse button allows the user to browse a list of font names known to the server and select one for insertion into the font name control. When the user selects the upload button, step 432B checks to verify there is a proper font name in the font name control and, if so, step 434B uploads a request for a match-results page with the named font.

As shown in FIG. 47, when the server receives such a request for a match-results page, step 486B tests if the server has a font file for the named font specified in the request. If so, step 490B pattern matches character-font shapes of the named font against other character-font shapes of fonts stored on the server, and step 492 generate and download a match-results page.

FIG. 48 shows that when the browser receives the download of such a match-results page, its response is identical to that described in FIG. 24 except that instead of displaying an image of an uploaded image, its step 500B displays the uploaded font name and an image of character-font shapes from the font identified by that name.

FIG. 49 is very similar to FIG. 46 except that it allows a user to select a font to be matched by copying a portion of text in that font to his computer's clipboard and then uploading the resulting tagged text, which includes the name of the text's font. As shown in FIG. 49, the first Identafont page includes text telling a user how to perform such a process. The page includes a paste button 420C and steps 426C and 428C which causes any fonted text currently in the client computer's clipboard to be copied to a paste-text window 418C. When the user selects the upload button, step 432C tests if there is fonted text from only one font in the pasted-text window. If so, step 434C uploads a request for the match-results page with tagged text from the pasted-text window which includes the selected text shown in that window and the name of the font they are in. The server responds to such a request in the manner described in FIG. 47, and the resulting match-results page is responded to by the client as described above with regard to FIG. 48.

In the steps of FIG. 49, the system uploads tagged text correspond to the fonted text the user has selected. In other embodiments of this aspect of the invention, the client could extract the name of the font used in the user selected fonted text and merely upload that name with the request for the match results page.

It should be understood that the foregoing description and drawings are given merely to explain and illustrate the invention and that the invention is not limited thereto, except insofar as the interpretation of the appended claims are so limited. Those skilled in the art who have the disclosure before them will be able to make modifications and variations therein without departing from the scope of the invention.

In particular, it should be noted that this application explains the present invention in more detail than is common in many patent applications, and the inventor trusts he will not be improperly punished for providing a more detailed teaching of his invention to the public by having the scope of his claims limited to that more detailed teaching, since such punishment would be contrary to one of the primary purposes of the patent system, which is to reward inventors for teaching their inventions to the public. Considerable thought has gone into the wording of the following claims so that they will provide an accurate description of what the inventor considers to be his invention, and it is hoped that such wording will be viewed as the most accurate description of exactly which details are considered to be part of an invention recited by a particular claim and those which are not.

For example, it should be understood that the invention of the present application, as broadly claimed, is not limited to use with any one type of OS, computer hardware, or network protocol.

Although much of the discussion above has been focused on World Wide Web servers, it should be understood that many aspects of the invention are applicable to other types of network servers. It should also be understood that the invention can be used not only on the Internet, but also with other forms of computer networks, including local area networks and wide area networks. In fact certain claimed aspects of the invention can be performed on a non-networked computer.

It should be understood that the behavior described in the claims below, like virtually all computer behaviors, can be performed by many different programming and data structures, using substantially different organization and sequencing. This is because programming is an extremely flexible art in which a given idea of any complexity, once understood by those skilled in the art, can be manifested in a virtually unlimited number of ways. Thus, the claims are not meant to be limited to the exact steps and sequence of steps described in the figures.

This particularly true since the pseudo-code described in the text above has been highly simplified to enable it to more efficiently communicate that which one skilled in the art needs to know to implement the invention without burdening him or her with unnecessary details. In the interest of such simplification the structure of the pseudo-code described above often differs significantly from the structure of the actual code that a skilled programmer would probably want to use when implementing the invention.

Furthermore, many of the functions which are shown being performed in software in the specification could be performed in hardware in other embodiments.

It should be understood that the Identafont aspect of the invention could be performed differently in other embodiments of the invention. For example, in some embodiments other methods could be used for allowing a user to help identify the character-fonts shapes which exits in a given uploaded image, particularly if the image shows the font against a background which makes it harder for automatic font recognition to work. This could include such alternate methods of allowing the user to help in the recognition process as having the user type in the characters of the letters in the desired font before the image is uploaded, as mentioned above, allowing the user variably size and drag images of characters in different fonts to the location in the image where the corresponding letters of the desired font are, or providing the user with a Bezier curve description of character-font shapes recognized by the Identafont process which the user can edit to correct.

It should be understood that in different embodiments of many aspect of the invention there could be different allocations of functionality between the client and server. In the major embodiment described above the server downloads a user interface in the form of a succession of web pages. In different embodiments of the invention different amounts of information regarding a session or transaction with a given user or client could be stored with server. For example, in the Identafont process the server could remember almost all of the information which has been uploaded to it in each previous step of an Identafont process until the process is complete, or could rely on each successive request from a client relating to a given Identafont process to contain all the information needed to process that request.

In other systems, particularly those in which there is greater bandwidth between the client and the server, it may be more attractive to have more of the functionality performed by the client. In such cases the server could download all or a part of the user interface at one time as an applet or an application. Such applets or applications could perform much of the functionality performed by the server in the pseudo-code above. For example, in some embodiments of some aspects of the invention, tasks such as pattern matching or performing searches in multi-dimensional font space could actually be performed on the client. In some such embodiments, the server could actually download a large number of font files in a coded form and the user's ability to use individual fonts could be controlled by means of a code signal which would make them available for use.

Those who are knowledgeable about designing computer interfaces, and particularly user interfaces on the World Wide Web, know that there are an unlimited number of ways to design a user interface to perform almost any function. Readers should understand that unless the wording of the claims below are specifically limited to a given user interface feature, the claims are not to be limited to any particular user interface which has been specified above for purposes of example.

The major embodiment of the invention described above involved an e-commerce web site from which fonts can be purchased. When this specification and the claims below refer to the sale or purchase of fonts those words are meant to cover licensing of fonts in return for money as well as their outright sale. Such licenses could include limitations on the right to use the downloaded font files, including limitations on copying, on the number of machines in which they can be used, on the number of characters of a given font which can be used, or on the length of time for which they could be used. As is indicated by the claims below, some aspects of the invention are not limited to the commercial distribution of fonts. For example, some aspects of the invention could be used to help users working for one company selected and obtain copies of font files which are appropriate for their particular document needs. Some other aspects of the claimed invention are not even limited to the distribution of fonts at all, such as those relating to a method of selecting fonts.

In the embodiment of the invention shown in FIG. 1, the font store web site bills customers for font downloads indirectly, through use of a credit card processor. In other embodiments of this aspect of the invention, virtually any other means of charging a client for the download or use of fonts could be employed. For example, the downloaded fonts might include software which would credit the font store or a font vendor each time they are used. The font store site could actually store credit accounts for major customers and charge the cost of font downloads directly to such the accounts.

It should be understood that in some embodiments of many aspects of the invention functions which are recited as being performed by the server or the client could actually be performed by a plurality of computers. For example, it is now common for large web sites to use a plurality of computers which function together as a web server. Functionality could be distributed across such machines in virtually any desired manner. For example, it is possible that the font store web site might cause fonts which have been purchased from it to be downloaded directly to customers from the web sites of the particular font vendors who sell such fonts. Similarly, it should be obvious that the account charged for the downloading of a font need not be a personal account of the person downloading them, but could be a corporate or institutional account, or an account of a friend of family member.

In the claims that follow the word font is intended to cover font families as well as individual fonts, unless the context of the claims makes it clear that the more limited meaning of individual font is intended. Similarly, unless a contrary intent is clearly intended, the word font is intended to cover bitmapped fonts as well as scalable fonts.

What we claim is:

1. A method performed by computing machinery for enabling a user to select a font comprising:

storing information about each of a set of fonts, including a value of each of a plurality of attributes for each such font, which attributes, and the values of such attributes, define a multi-dimensional font space in which each of said fonts has a position;

providing a font-selection user interface that enables a user to select a font from said font space;

responding to a user selection of a font through the font selection interface by making the selected font the currently selected font, including using the stored attribute values of the currently selected font to define a currently selected point in said multi-dimensional font space; and then performing the following sequence one or more times:

providing a spatial-specification user interface that enables the user to select a spatial specification relative to said currently selected point from among a plurality of such spatial specifications, each of which user-selectable spatial specifications defines a sub-portion of said font space defined by position relative to the currently selected point, with different spatial specifications defining sub-portions of said font space with different displacements in different dimensions of said space relative to the currently selected point;

responding to a user selection of a spatial specification through said spatial-specification interface by making the selected spatial specification the current spatial specification;

searching to find which one or more fonts, if any, are in the sub-portion of the font space defined by the currently selected spatial specification;

displaying one or more character-font shapes of the one or more fonts found by the search to be in the current spatial specification's sub-portion of the font space; and—making one of the said displayed fonts in the current specification's sub-portion of the font space the new currently selected font relative to which a new spatial specification can be selected by said spatial-specification interface, including using the stored attribute values of the new currently selected font to define a new currently selected point in said multi-dimensional font space.

2. A method as in claim 1 wherein when only one font occurs in the sub-portion of the font space defined by the currently selected spatial specification, said one font is automatically made the currently selected font relative to which a new spatial specification can be selected.

3. A method as in claim 1 wherein when more than one font occurs in the sub-portion of the font space defined by the currently selected spatial specification, the font selection user interface enables a user to select which of the fonts found by said search is to be made the new currently selected font.

4. A computerized method as in claim 1 wherein:

said method is executed by an e-commerce server computer which can communicate with one or more client computers over a computer network;

said server downloads a user interface to a given client computer which includes all or a part of said font selection and spatial selection interfaces;

said downloaded user interface includes a user interface that allows a user to select to pay for the use of a selected font and which uploads to the server information about such a selection to pay for a selected font; and said server responds to an upload of information about such a selection to pay for a selected font by billing an account associated with the user.

5. A method performed by computing machinery for enabling a user to select a font comprising:

storing information about each of a set of fonts, including a value of each of a plurality of attributes for each such font, which attributes, and the values of such attributes, define a multi-dimensional font space in which each of said fonts has a position;

providing a user interface that enables a user to select a font from said font space;

responding to such a user selection of a font by making the selected font the currently selected font, including using the stored attribute values of the currently selected font to define a currently selected point in said multi-dimensional font space;

performing a search to find a sub-set of the fonts in said multi-dimensional font space which are within a sub-portion of the font space defined by a given distance metric relative to the position of said currently selected point; and making the sub-set of fonts found by said search the currently selectable fonts;

displaying one or more character-font shapes of each such currently selectable font;

wherein:

said providing of a user interface includes providing a user interface that enables the user to select one of the displayed currently selectable fonts found by said search; and said responding to a selection of a font includes responding to the selection of one of said displayed fonts found by the search by making the selected font said currently selected font.

6. A method performed on a server computer for making fonts available to client computers over a computer network comprising:

uploading from a given client computer an image of one or more sample character-font shapes belonging to a given font;

performing pattern matching between the character-font shapes in the uploaded image and character-font shapes from each of a plurality of fonts stored on the server to select one or more of said stored fonts having character-font shapes which best match the uploaded character-font shapes;

downloading to the client a representation of each of one or more of said best matching fonts, including one or more displayable character-font shapes for each such font;

uploading information from the client identifying one or more fonts as having been selected for downloading, which selected fonts can include the best matching fonts downloaded to the client; and downloading the one or more fonts identified as selected for downloading to the client in a form which enables such fonts to be used by the client's operating system for rendering text in said downloaded fonts;

wherein said method includes downloading to said given client computer a user interface which:

provides controls which help a user of the given computer upload said image;

displays said downloaded representations of the best matching fonts as currently selectable fonts;

enables a user to select one or more of said currently selectable fonts as a font selected for downloading; and responds to a selection of one or more fonts as fonts selected for downloading by uploading said information identifying said fonts as fonts selected for downloading; and wherein the server downloads to the client not only said representation of each of the one or more best matching fonts but also an indication of the relative closeness of the match between each of those best matching fonts and the character-font shapes in the uploaded image.

7. A method performed by computing machinery for enabling a user to select a font comprising:

storing information about each of a set of known fonts, including a value of each of a plurality of attributes for each such fonts, which attributes, and the values of such attributes, define a multi-dimensional font space in which each of said fonts has a position;

receiving from a user an image of sample character-font shapes belonging to a given font;

performing pattern matching between the sample character-font shapes and stored representations of character-font shapes from each of a plurality of said known fonts to select one or more of the known fonts having character-font shapes which best match the character-font shapes received from the user;

displaying the one or more best matching fonts, including one or more character-fonts shapes of each such font, as currently selectable fonts;

providing a font selection user interface that enables the user to select one of said currently selectable fonts;

responding to a user selection of a font through the font selection interface by making the selected font the currently selected font, including using the stored attribute values of the currently selected font to define a currently selected point in said multi-dimensional font space; and performing the following sequence one or more times:

providing a spatial specification user interface that enables the user to select a spatial specification relative to said currently selected point from among a plurality of such spatial specifications, each of which specifications defines a sub-portion of said font space defined by position relative to the currently selected point, with different spatial specifications defining sub-portions of said font space with different extents in different dimensions of said space;

responding to a user selection of a spatial specification through said spatial specification interface by making the selected spatial specification the current spatial specification;

searching to find which one or more fonts, if any, are in the sub-portion of the font space defined by the currently selected spatial specification; and displaying one or more character-font shapes of the one or more fonts found by the search to be in the current specification's sub-portion of the font space; and making one of the said fonts in the current specification's sub-portion of the font space the currently selected font relative to which a new spatial specification can be selected by said spatial specification interface, including using the stored attribute values of the new currently selected font to define a new currently selected point in said multi-dimensional font space.

8. A method as in claim 7 wherein when only one font occurs in the sub-portion of the font space defined by the currently selected spatial specification, said one font is automatically made the currently selected font relative to which a new spatial specification can be selected.

9. A method as in claim 7 wherein when more than one font occurs in the sub-portion of the font space defined by the currently selected spatial specification, the font selection user interface enables a user to select which of the fonts found by said search is to be made the new currently selected font.

10. A computerized method as in claim wherein:

said method is performed by a client/server system comprised of a server computer and one or more client computers connected to the server computer by the internet;

the server downloads a user interface to a given client which has communicated with it;

the downloaded interface prompts the user to select an image of one or more character-font shapes and uploads that image to the server;

the server receives the uploaded image, performs the pattern matching on character-font shapes in the uploaded image, and downloads a displayable representation of character-font shapes of said one or more best matching font to the client; and the downloaded interface receives the downloaded representations of the best matching fonts, and includes said font selection interface, which displays the best matching fonts as the currently selectable fonts, and allows the user to select one of the currently selectable fonts as the currently selected font.

11. A computerized method as in claim 10 wherein:

the downloaded interface also includes said spatial specification user interface, which allows the user to select the current spatial specification and uploads the identification of the current spatial specification to the server;

the server determines which, if any, known fonts are in the portion of the font space defined by the currently selected spatial specification and downloads a representation of such known fonts to the downloaded interface;

the downloaded interface displays the downloaded fonts which the server has found to be within the currently selected spatial specification, and through said font selection interface enable the user to select one of the resulting currently selectable fonts as the currently selected font.

* * * * *